US010423226B2

(12) United States Patent
Chen et al.

(10) Patent No.: US 10,423,226 B2
(45) Date of Patent: Sep. 24, 2019

(54) SYSTEMS AND METHODS OF PROVIDING HAPTIC-LIKE FEEDBACK IN THREE-DIMENSIONAL (3D) SENSORY SPACE

(71) Applicant: Leap Motion, Inc., San Francisco, CA (US)

(72) Inventors: Pohung Chen, Fremont, CA (US); David S Holz, San Francisco, CA (US)

(73) Assignee: Ultrahaptics IP Two Limited, San Francisco, CA (US)

(*) Notice: Subject to any disclaimer, the term of this patent is extended or adjusted under 35 U.S.C. 154(b) by 43 days.

(21) Appl. No.: 14/616,603

(22) Filed: Feb. 6, 2015

(65) Prior Publication Data

US 2015/0227203 A1 Aug. 13, 2015

Related U.S. Application Data

(60) Provisional application No. 61/937,410, filed on Feb. 7, 2014.

(51) Int. Cl.
| | | |
|---|---|---|
| *G06F 3/041* | (2006.01) | |
| *G06F 3/01* | (2006.01) | |
| *G06F 3/0481* | (2013.01) | |
| *G06K 9/00* | (2006.01) | |
| *G06F 3/03* | (2006.01) | |
| *G06F 3/0346* | (2013.01) | |

(52) U.S. Cl.
CPC .............. *G06F 3/016* (2013.01); *G06F 3/017* (2013.01); *G06F 3/0304* (2013.01); *G06F 3/0346* (2013.01); *G06F 3/04815* (2013.01); *G06K 9/00355* (2013.01)

(58) Field of Classification Search
None
See application file for complete search history.

(56) References Cited

U.S. PATENT DOCUMENTS

| 8,942,881 B2 | 1/2015 | Hobbs et al. | |
|---|---|---|---|
| 9,552,673 B2 | 1/2017 | Hilliges et al. | |
| 2005/0168461 A1* | 8/2005 | Acosta | G06T 15/08 345/419 |
| 2008/0059131 A1* | 3/2008 | Tokita | G06F 3/011 703/5 |
| 2008/0300055 A1* | 12/2008 | Lutnick | G07F 17/3209 463/39 |
| 2011/0231797 A1* | 9/2011 | Huhtala | G06F 1/1626 715/811 |

(Continued)

OTHER PUBLICATIONS

U.S. Appl. No. 14/616,612—Office Action dated May 12, 2017, 24 pages.

(Continued)

*Primary Examiner* — Carl Adams
(74) *Attorney, Agent, or Firm* — Haynes Beffel & Wolfeld LLP; Ernest J. Beffel, Jr.

(57) ABSTRACT

The technology disclosed relates to providing haptic-like feedback for an interaction between a control object and a virtual object. In particular, it relates to defining virtual feeler zones of the control object and generating for display a feeler indicator that provides visual feedback over a range of hover proximity of the feeler zones to the virtual object, applied forces on the virtual object, and other material properties of the virtual object.

29 Claims, 23 Drawing Sheets

(56) References Cited

U.S. PATENT DOCUMENTS

| | | | |
|---|---|---|---|
| 2011/0279397 A1* | 11/2011 | Rimon | G06F 3/044 |
| | | | 345/173 |
| 2011/0304541 A1* | 12/2011 | Dalal | G06F 3/017 |
| | | | 345/158 |
| 2013/0225999 A1 | 8/2013 | Banjanin et al. | |
| 2013/0241832 A1 | 9/2013 | Rimon et al. | |
| 2013/0296057 A1 | 11/2013 | Gagner et al. | |
| 2014/0006997 A1 | 1/2014 | Kim et al. | |
| 2014/0184496 A1 | 7/2014 | Gribetz et al. | |
| 2014/0189579 A1 | 7/2014 | Rimon et al. | |
| 2014/0361956 A1* | 12/2014 | Mikhailov | G02B 27/0179 |
| | | | 345/8 |
| 2015/0016777 A1 | 1/2015 | Abovitz et al. | |

OTHER PUBLICATIONS

U.S. Appl. No. 14/616,612—Response to Office Action dated Sep. 26, 2016 filed Dec. 22, 2016, 14 pages.
U.S. Appl. No. 14/616,612—Response to Office Action dated May 12, 2017 filed Sep. 12, 2017, 15 pages.
U.S. Appl. No. 14/616,612—Office Action dated Nov. 1, 2017, 27 pages.
U.S. Appl. No. 14/616,612—Response to Office Action dated Nov. 1, 2017, filed Apr. 30, 2018, 14 pages.
U.S. Appl. No. 14/616,612—Office Action dated Sep. 6, 2018, 28 pages.
U.S. Appl. No. 14/616,612—Response to Office Action dated Sep. 6, 2018, filed Dec. 6, 2018, 14 pages.
U.S. Appl. No. 14/616,612—Office Action dated Sep. 26, 2016, 21 pages.

* cited by examiner

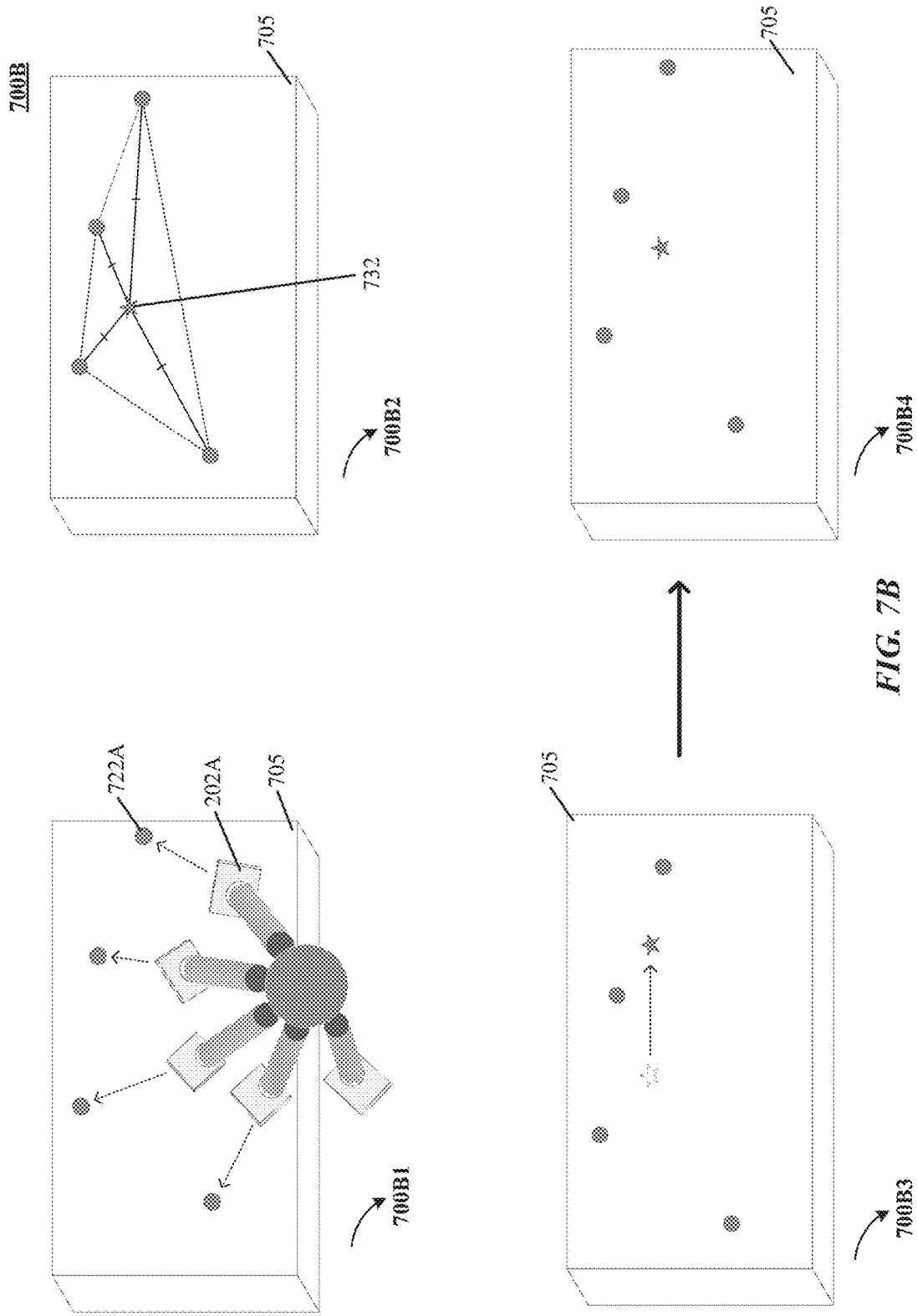

SYSTEMS AND METHODS OF PROVIDING HAPTIC-LIKE FEEDBACK IN THREE-DIMENSIONAL (3D) SENSORY SPACE

RELATED APPLICATIONS

The application claims the benefit of U.S. provisional Patent Application No. 61/937,410, entitled, "SYSTEMS AND METHODS OF PROVIDING HAPTIC-LIKE FEEDBACK IN THREE-DIMENSIONAL (3D) SENSORY SPACE," filed on Feb. 7, 2014. The provisional application is hereby incorporated by reference for all purposes.

This application is related to U.S. patent application entitled "SYSTEMS AND METHODS OF DETERMINING INTERACTION INTENT IN THREE-DIMENSIONAL (3D) SENSORY SPACE," Ser. No. 14/616,612 filed contemporaneously. The related application is incorporated by reference for all purposes.

FIELD OF THE TECHNOLOGY DISCLOSED

The technology disclosed relates, in general, to interacting with virtual objects in virtual spaces, and in particular implementations, to providing haptic-like feedback for interactions and manipulations of virtual objects.

INCORPORATIONS

Materials incorporated by reference in this filing include the following:

Velocity Field Interaction for Free Space Gesture Interface and Control, U.S. Prov. App. No. 61/891,880, filed 16 Oct. 2013, Interactive training recognition of free space gestures for interface and control, U.S. Prov. App. No. 61/872,538, filed 30 Aug. 2013, Methods and systems for identifying position and shape of objects in three-dimensional space, U.S. Prov. App. No. 61/587,554, filed 17 Jan. 2012, Systems and methods for capturing motion in three-dimensional space, U.S. Prov. App. No. 61/724,091, filed 8 Nov. 2012, Non-tactile interface systems and methods, U.S. Prov. App. No. 61/816,487, filed 26 Apr. 2013, Dynamic user interactions for display control, U.S. Prov. App. No. 61/752,725, filed 15 Jan. 2013, Motion capture using cross-sections of an object, U.S. application Ser. No. 13/414,485, filed 7 Mar. 2012, and System and methods for capturing motion in three-dimensional space, U.S. application Ser. No. 13/742,953, filed 16 Jan. 2013.

BACKGROUND

Manipulation of virtual objects is one of the most fundamental operations in virtual spaces. Virtual spaces are composed of interactive simulations of real-world environments that provide users with a sense of being immersed in the interactive simulations. There is a perceived need to add haptic feedback to virtual spaces, which has led to a number of prototype devices that simulate tactile sensations with applications of mechanical force, generally referred to as "haptic rendering."

Most existing haptic rendering systems rely on specialized hardware worn by the subject while using the system and/or on the strategic placement of such hardware in the environment to provide the haptic rendering. Such systems tend to be expensive to construct. In addition, specialized hardware worn by the subject can be cumbersome and interfere with the subject's natural movement. Further, systems involving large quantities of complex hardware tend not to operate in real time, due to the delays inherent to mechanical devices. Such considerations of cost, complexity and convenience have limited the deployment and use of haptic rendering technology.

Also, the existing haptic rendering systems are limited with regards to providing realistic responses of virtual objects to interactions. For instance, due to the inherent mechanical compliance of existing haptic interface devices, the maximum rigidity of virtual objects is limited such that a virtual object deforms to a greater degree in response to an applied force than it would in real life. Thus, leading to a diminished sense of realness to perception of virtual objects and degraded user experience.

An opportunity arises to provide an economical approach that provides advantages of haptic feedback for interaction with virtual objects without the draw backs of attaching or deploying specialized hardware. An opportunity also arises to eliminate unrealistic responses of virtual objects to interactions and to avoid aberrations during manipulations of the virtual objects.

SUMMARY

The technology disclosed relates to providing sensory feedback for an interaction between a control object in a three-dimensional (3D) sensory space and a virtual object in a virtual space that the control object interacts with. In some implementations, the 3D sensory space and the virtual space can be overlapped, in part or in whole, to generate a synthetic or augmented space.

In particular, it relates to providing haptic-like and other sensory feedback to the user of a virtual space. Implementations include defining a virtual feeler zone of the control object and generating for display a feeler indicator that provides visual feedback over a range of hover proximity of the feeler zone to the virtual object, applied force on the virtual object resulting from virtual contact of the feeler zone with the virtual object, and other material properties of the virtual object.

The technology disclosed also relates to determining intent for an interaction between a control object in a three-dimensional (3D) sensory space and a movable virtual object in a virtual space that the control object interacts with. In particular, it relates to defining a plurality of feeler zones of the control object and calculating a center of effort for the forces applied by the feeler zones on the virtual object. Movement of the points of virtual contacts and the center of effort are then monitored to determine a gesture-type intended for the interaction.

The technology disclosed further relates to determining intent for an interaction between a control object in a three-dimensional (3D) sensory space and a movable virtual object in a virtual space that the control object interacts with. In particular, it relates to defining a plurality of feeler zones of the control object and calculating a center of effort for the forces applied by the feeler zones on the virtual object. The number of points of virtual contacts of the feeler zones and proximities between the points of virtual contacts are used to determine a degree of precision of the control object-gesture.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 7B is one implementation of identifying a intent as translational.

FIG. 9 depicts a representative method of providing haptic-like feedback for an interaction between a control object in a three-dimensional (3D) sensory space and a virtual object in a virtual space that the control object interacts with.

FIG. 10 illustrates one implementation of a method of determining intent for an interaction between a control object in a three-dimensional (3D) sensory space and a movable virtual object in a virtual space that the control object interacts with.

DESCRIPTION

Implementations of the technology disclosed relate to methods and systems that provide sensory feedback to the users for their interactions with virtual objects in virtual spaces. This sensory feedback includes providing pseudo-haptic feedback, a haptic-like feedback or perception of different physical properties of the virtual objects using one or more of the human senses (e.g., visual or aural) in a virtualized world. In one implementation, haptic-like feedback or perception refers to the use of visual cues for providing information about material or physical properties of the virtual objects.

As used herein, a given signal, event or value is "dependent on" a predecessor signal, event or value of the predecessor signal, event or value influenced by the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

Figure 1A:
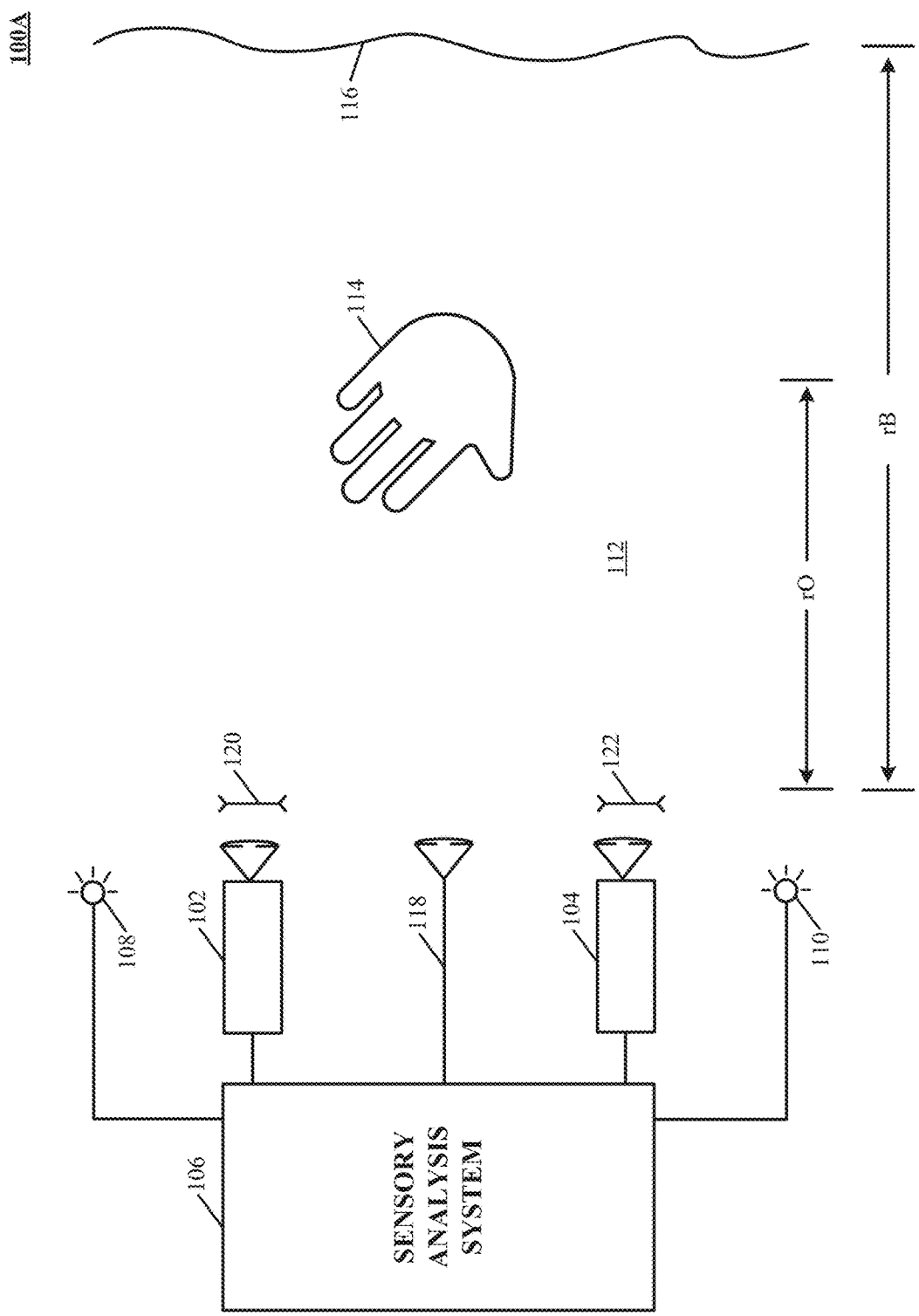
FIG. 1A illustrates a system for capturing image data according to an implementation of the technology disclosed.

Referring first to FIG. 1A, which illustrates an exemplary gesture-recognition system 100A including any number of cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 100A includes one or more sources 108, 110, which can be disposed to either side of cameras 102, 104, and are controlled by sensory-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object portion 114 (in this example, a hand) that may optionally hold a tool or other object of interest and cameras 102, 104 are oriented toward the region 112 to capture video images of the hand 114. In some implementations, the operation of light sources 108, 110 and cameras 102, 104 is controlled by the sensory-analysis system 106, which can be, e.g., a computer system, control logic implemented in hardware and/or software or combinations thereof. Based on the captured images, sensory-analysis system 106 determines the position and/or motion of object 114.

Figure 1B:
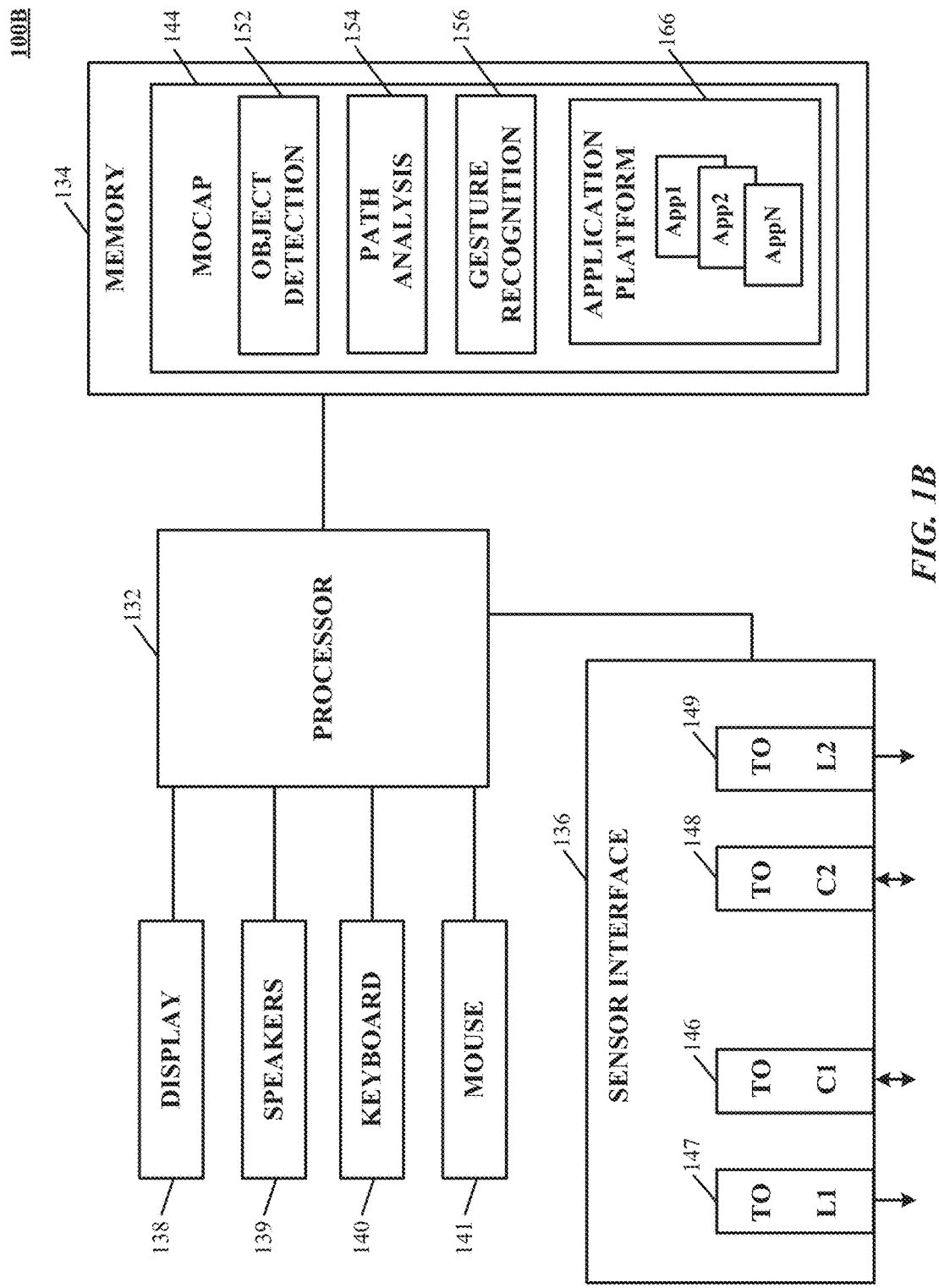
FIG. 1B is a simplified block diagram of a gesture-recognition system implementing an image analysis apparatus according to an implementation of the technology disclosed.

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 (or other presentation mechanism(s), e.g. holographic projection systems, wearable googles or other head mounted displays (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG. 1A, as well as associated light sources such as light sources 108, 110 of FIG. 1A. Thus, for example, sensor interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Sensor interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object analysis module 154, and a gesture-recognition module 156. Object detection module 152 can analyze images (e.g., images captured via sensor interface 136) to detect edges of an object therein and/or other information about the object's location. Object analysis module 154 can analyze the object information provided by object detection module 152 to determine the 3D position and/or motion of the object (e.g., a user's hand). Examples of operations that can be implemented in code modules of mocap program 144 are described below. Memory 134 can also include other information and/or code modules used by mocap program 144 such as an application platform 166 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1A and 1B, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by a gesture-recognition module 156, which can be implemented as another module of the mocap 144. Gesture-recognition module 156 provides input to an electronic device, allowing a user to remotely control the electronic device and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the sensory-analysis system 106 can not only recognize gestures for purposes of providing input to the electronic device, but can also capture the position and shape of the user's hand in consecutive video images in order to characterize the hand gesture in 3D space and reproduce it on the display screen 138.

In one implementation, the gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Feeler Zone and Feeler Indicator

Figure 2:
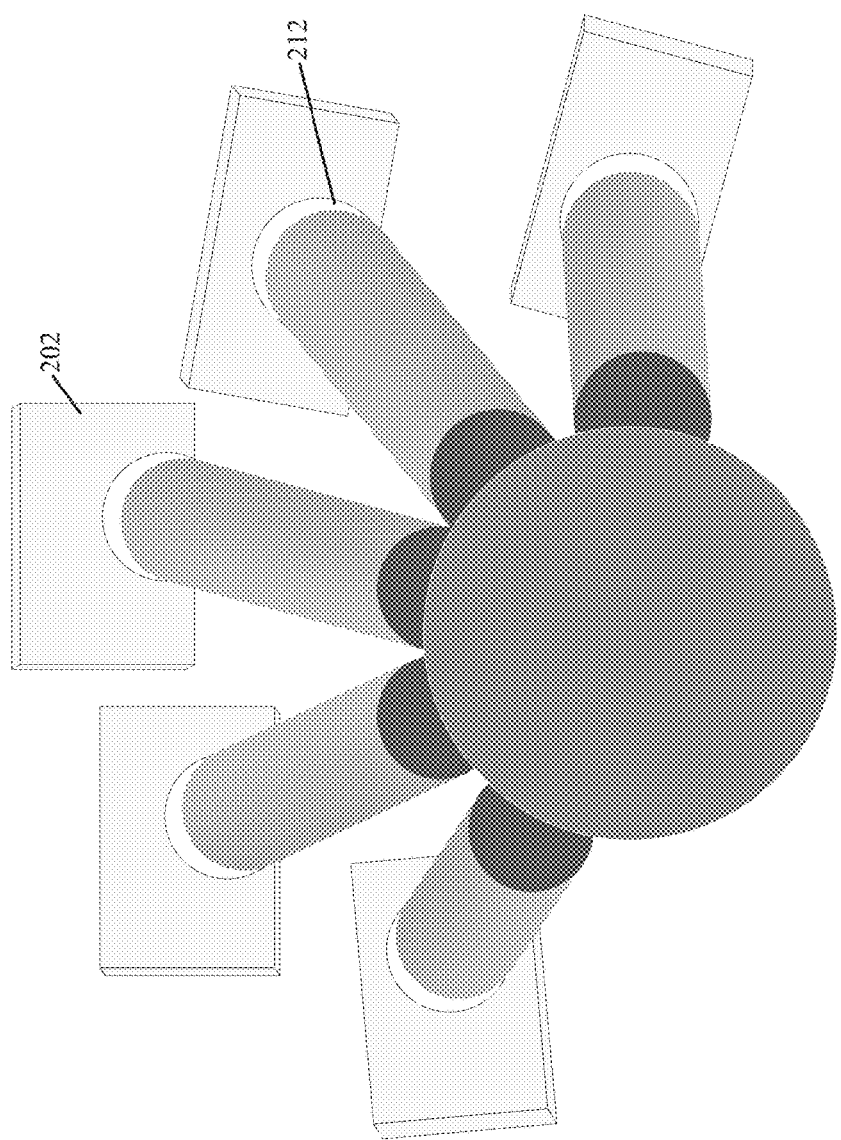
FIG. 2 shows one implementation of a feeler zone that reproduces movements of a control object in a three-dimensional (3D) sensory space.

FIG. 2 shows one implementation of a feeler zone 200 that reproduces movements a control object in a three-dimensional (3D) sensory space. In various implementations, after a user successfully initiates communications with the gesture-recognition system 156, the gesture-recognition system 156 generates a feeler zone 200 or a FIG. 200 (hereafter "feeler zone") representing a detected control object, in this case, a body's part (e.g., a hand) and displays it across the display 138. In one implementation, the gesture-recognition system 156 coherently locks the movement of the feeler zone 200 on the display 138 to follow the actual motion of the user's gesture. For example, when the user moves her hand in the upward direction, the displayed feeler zone 200 also moves upward on the display screen in response.

As a result, the motion of the feeler zone 200 directly maps user gestures to displayed content such that, for example, the user's hand and the feeler zone 200 behave like a PC mouse and a cursor on the monitor, respectively. This allows the user to evaluate the relationship between actual physical gesture movement and the resulting actions taking place on the display 138, e.g., movement of virtual objects displayed thereon. The absolute position of the hand, therefore, is typically not important for display control; rather, a relative position and/or direction of movement of the user's body controls the on-screen action, e.g., the movement of feeler zone 200.

In some implementations, feeler zone 200 can include sub-components that track portions of the control object, such as fingers of a hand. As shown in FIG. 2, a particular feeler zone 212 reproduces movements of a left index finger. In one implementation, feeler zone 212 is a virtual extension of the control object that is not one-to-one mapped to the control object. In another implementation, feeler zone 212 is a deformable region of the control object that proportionally depresses responsive to virtual contact with a virtual contact and pressure applied by the control object.

Referring to feeler indicator 202, it provides visual feedback regarding haptic properties (e.g., properties perceptible by pain (e.g., sharpness, pointedness), pressure (e.g., hardness, rigidity, flexibility), temperature, (e.g., hot, cold), somatosensory perception of surface characteristics (e.g., edges, curvature, texture, pattern recognition, smoothness, coarseness), other sensations perceptible by touch alone, or in conjunction with one or more other senses such as vision, hearing, smell, taste, proprioception, equilibrioception, and nociception, and combinations thereof) of virtual objects in virtual space. In one implementation, feeler indicator 202 is defined for particular portions of the control object like fingers and located at distal ends of the feeler zone 212, as shown in FIG. 2. Feeler indicator 202 can be receptive of different haptic properties of the virtual objects, including density, mass, viscosity, surface texture, or temperature. In some implementations, custom logic can be defined for feeler indicator 202 such that a physical attribute of the feeler indicator 202 like color, shape, size, or opacity can correspond to different threshold magnitudes of different haptic properties of the virtual objects. For instance, color blue can represent that a particular virtual object is less than two pounds or kilograms per cubic meter, color orange can indicate that the virtual object is between two and four pounds or kilograms per cubic meter, and color red can represent that the virtual object is more than four pounds or kilograms per cubic meter. In other implementations, physical attributes of the feeler indicator 202 are linked to proximity of the feeler zone 212 to a virtual object. In one example, as the feeler zone 212 approaches a virtual object; a color, shape, size, or opacity of the feeler indicator 202, or the combination thereof, is modified.

Figure 3A:
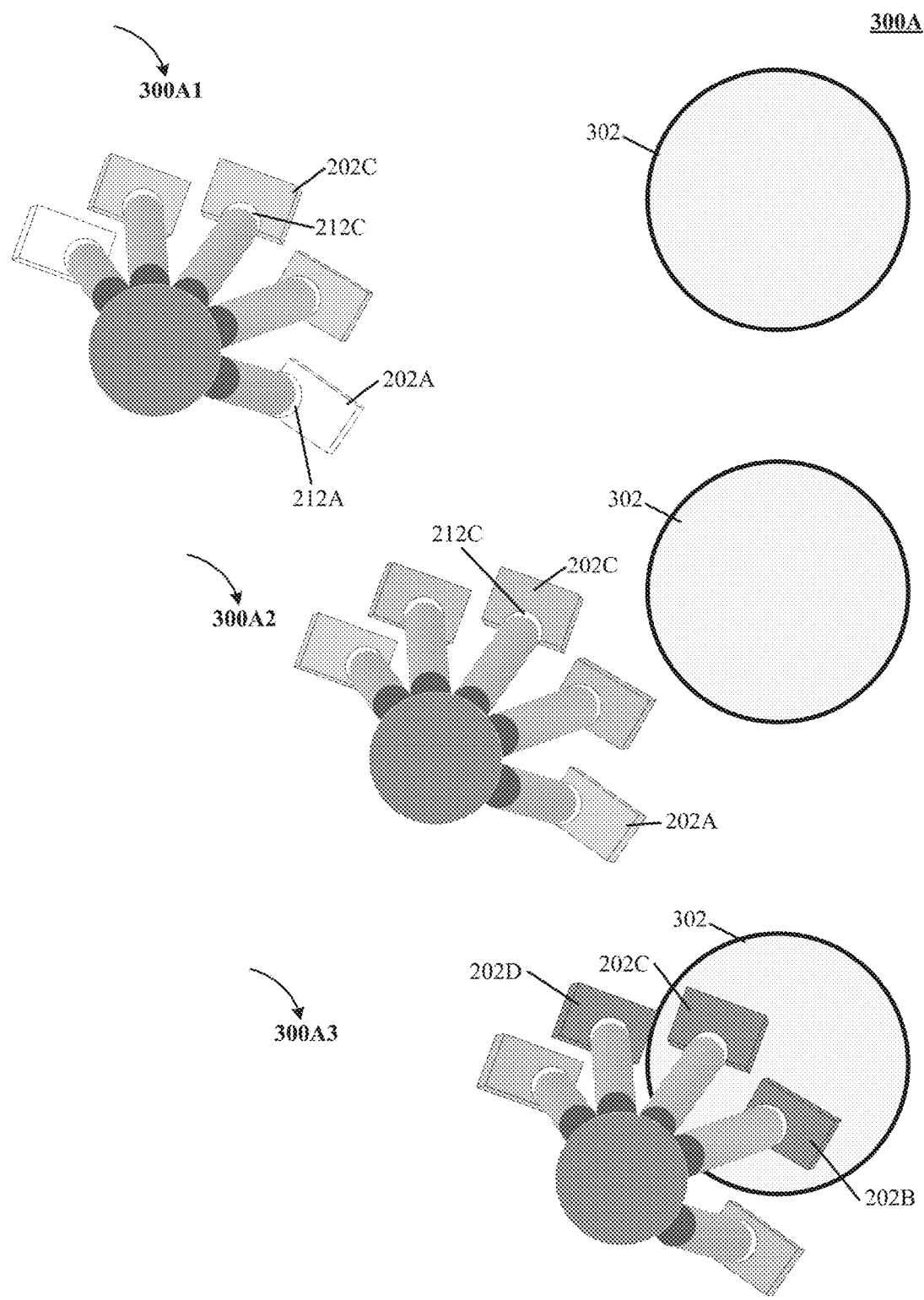
FIG. 3A illustrates one implementation of a feeler proximity-pressure indicator that provides visual feedback over a range of proximity and applied force.

FIG. 3A illustrates one implementation of a feeler proximity-pressure indicator 300A that provides visual feedback over a range of proximity and applied force. At action 300A1, feeler zone 212 is at an initial distance from the virtual object 302. In one implementation, custom logic for feeler zone 212 is defined such that particular feeler indicators that are closer to the virtual object 302 are darker than the ones that are further away. As shown in FIG. 3A, feeler proximity-pressure indicator 202C is darker than the feeler proximity-pressure indicator 202A because the feeler zone 212C (middle finger) is closer to the virtual object 302 than the feeler zone 212A (thumb).

At action 300A2, as the feeler zone 212 approaches the virtual object 302 in response to movement of the control object in the 3D space, particular feeler proximity-pressure indicators 202A-E continue to become darker proportional to their respective hover proximities to the virtual object 302. Further, at action 300A3, when the feeler zone 212 approaches the virtual object 302 within an initial hover proximity threshold, the feeler proximity-pressure indicator 202 snaps to the surface of the virtual object 302. As a result, the particular feeler proximity-pressure indicators 202B-D that touch the virtual object 302 have darker color densities than the ones that do not touch the virtual object 302 i.e. feeler proximity-pressure indicators 202A and 202E. In one implementation, proximity between the feeler zone 212 and virtual object 302 directly or inversely proportionates a physical attribute of the feeler proximity-pressure indicator 202 such as its color, shape, size, or opacity, as discussed later in this application.

Subsequent to the virtual contact at action 300A3, feeler zone 212 applies pressure on the virtual object 302. In one implementation, a spring function calculates the pressure applied by the virtual contact over a compressible range. For instance, the pressure is calculated based on Hooke's law (F=−kΔx) such that the amount of force applied is inversely proportional to the compression of the feeler zone 212. In another implementation, the magnitude of force applied directly or inversely proportionates a physical attribute of the feeler proximity-pressure indicator 202 such as its color, shape, size, or opacity, as discussed below.

Figure 3B:
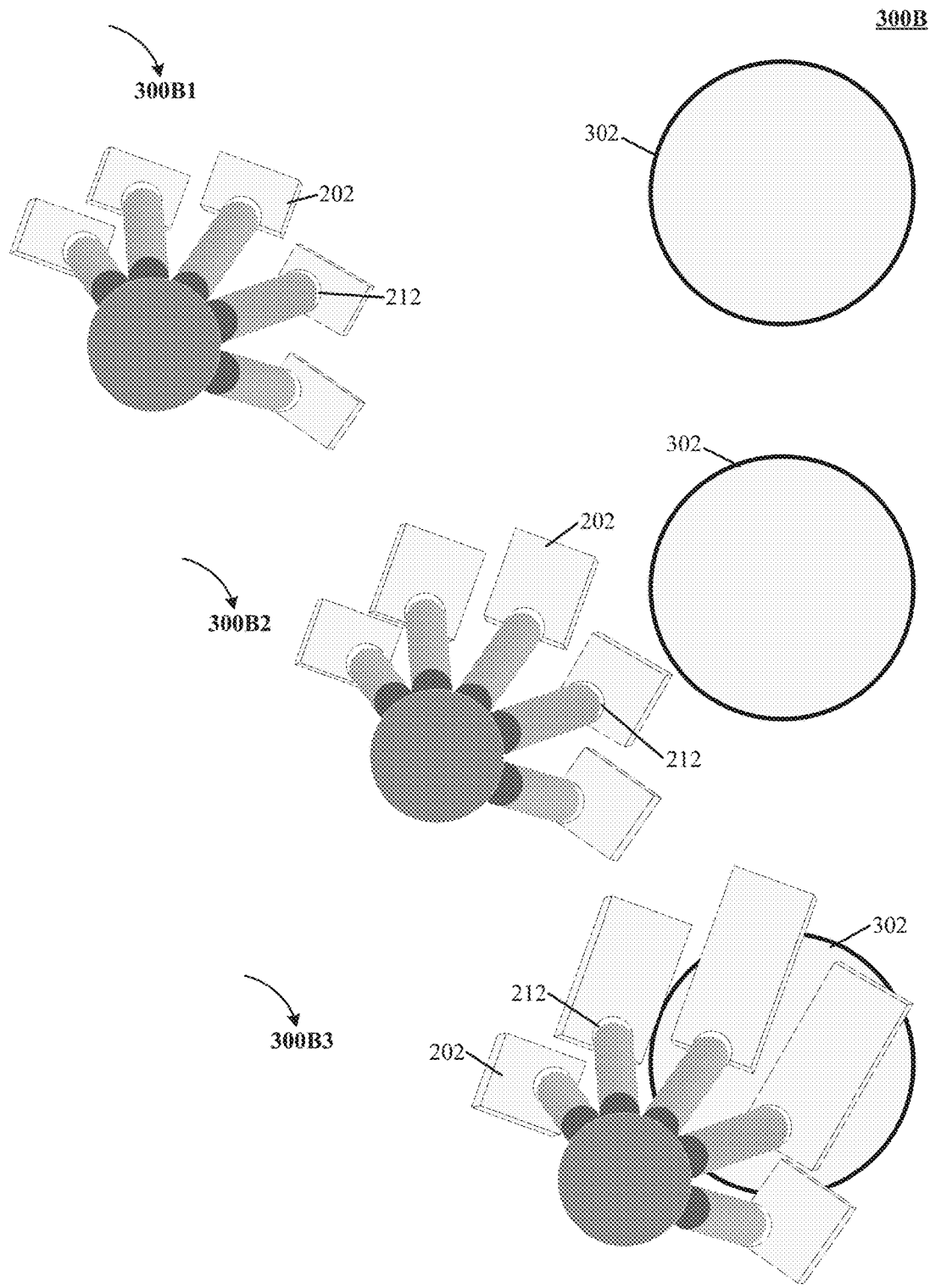
FIG. 3B is one implementation of modifying size of a feeler proximity-pressure indicator.
Figure 3C:
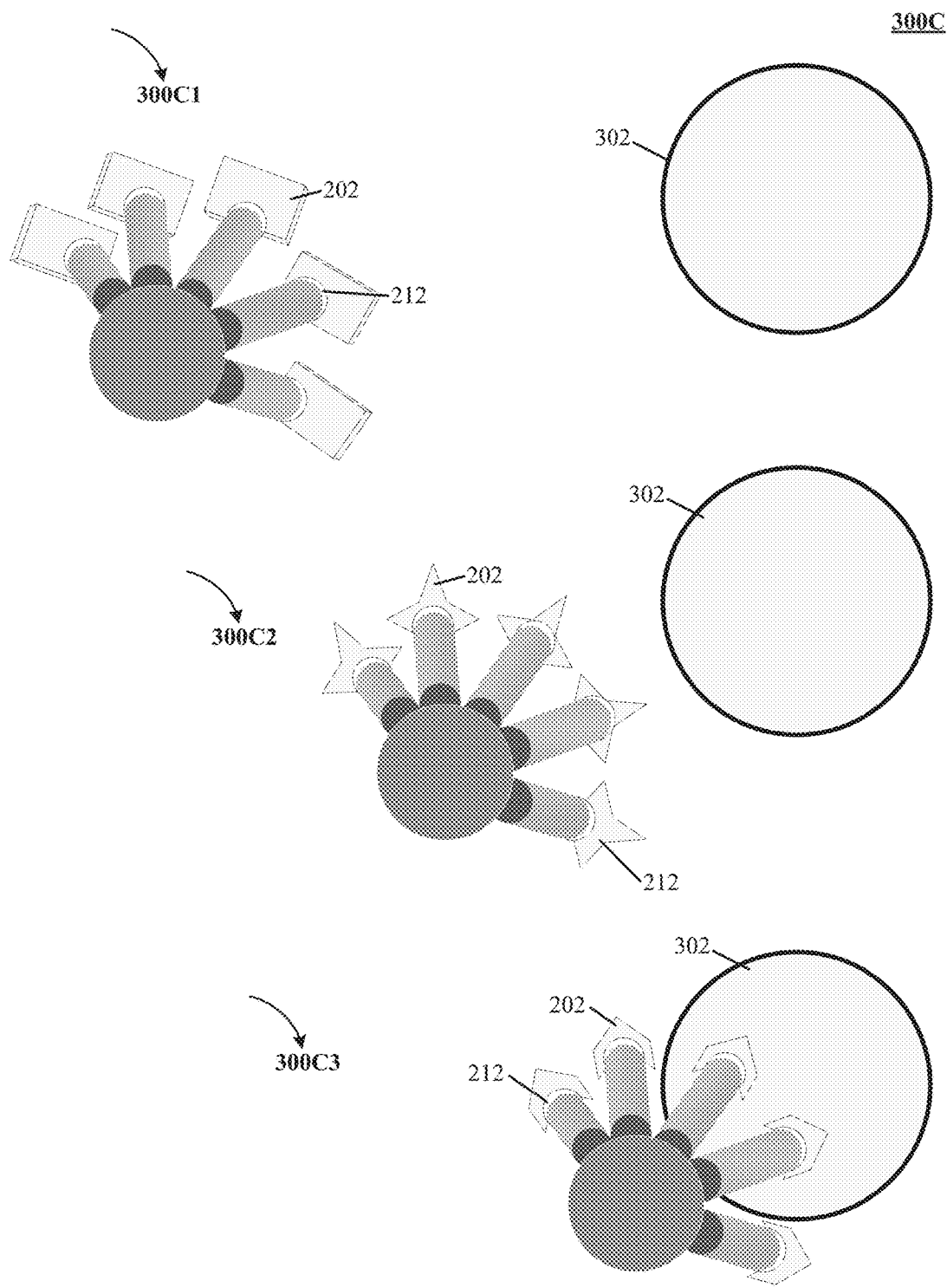
FIG. 3C illustrates one implementation of modifying shape of a feeler proximity-pressure indicator.
Figure 3D:
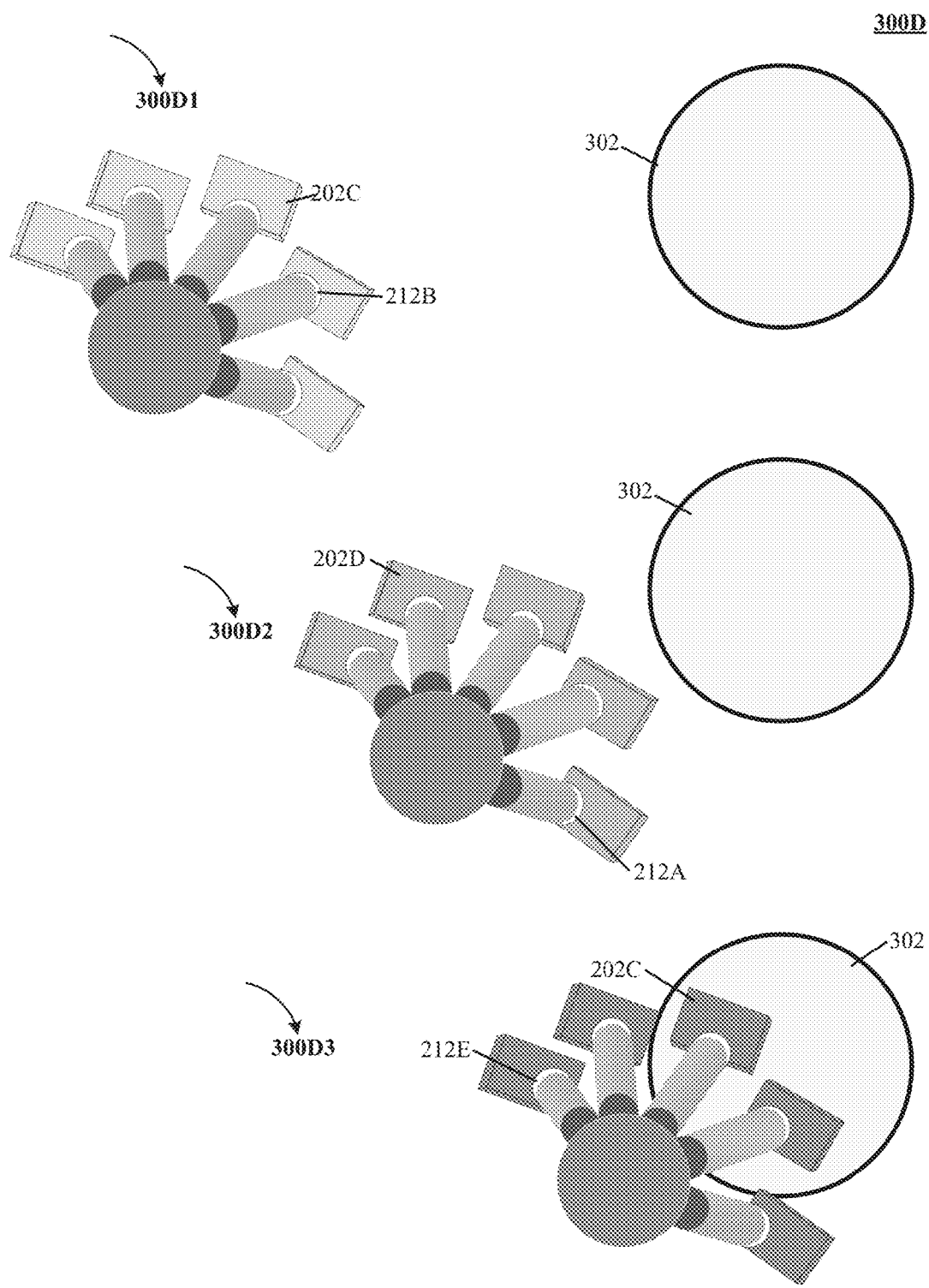
FIG. 3D shows one implementation of modifying opacity of a feeler proximity-pressure indicator.

FIG. 3B-D show different implementations of modifying size, shape, and opacity of the feeler proximity-pressure indicator 202 over a range of proximity with virtual object 302 and pressure applied by the feeler zone 212 on the virtual object 302. As FIG. 3B depicts, size of the feeler proximity-pressure indicator 202 increases as the feeler zone 212 moves closer to the virtual object 302 from action 300B1 to action 300B2. After coming in contact with the virtual object at action 300B2, size of the feeler proximity-pressure indicator 202 continues to increase responsive to increase in the pressure applied by the feeler zone 212.

In another implementation, as shown in FIG. 3C, as the feeler zone 212 approaches the virtual object 302 and further applies pressure on it from action 300C1 to action 300C3, shape of the feeler proximity-pressure indicator 202 changes from a quadrilateral, pentagon, and hexagon respectively. In yet another implementation, as shown in FIG. 3D, a change in opacity of the feeler proximity-pressure indicator 202 occurs as a function of distance between the feeler zone 212 and virtual object 302 and pressure applied by the feeler zone 212 on the virtual object 302, making the feeler proximity-pressure indicator 202 transparent, translucent, and opaque at actions 300C1-C3 respectively.

Haptic-Like Feedback

Some implementations include assigning haptic, material, or physical properties like mass, density, viscosity, elasticity, texture, or temperature to virtual objects. The haptic, material, or physical properties can be obtained from reference sources or experimentally measured data. In one implementation, these properties can be linear or non-linear, isotropic, or anisotropic, homogeneous or inhomogeneous. The gesture-recognition system 156 then generates virtual objects that simulate these properties.

Figure 4A:
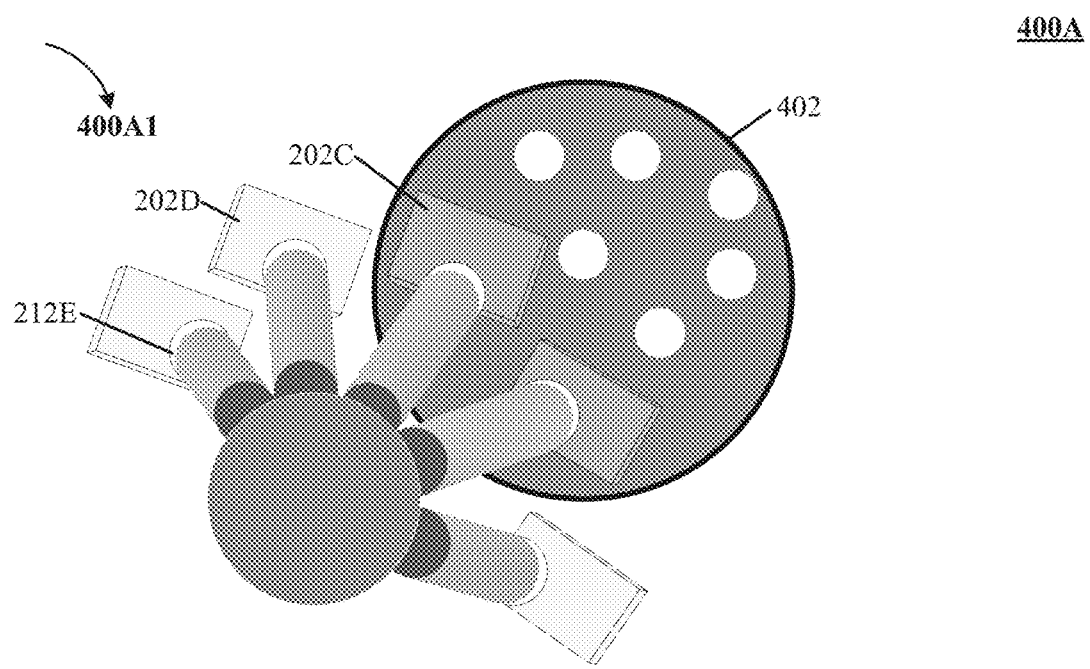
FIG. 4A illustrates one implementation of a feeler object-density indicator that provides visual feedback regarding density of a virtual object.
Figure 4A:
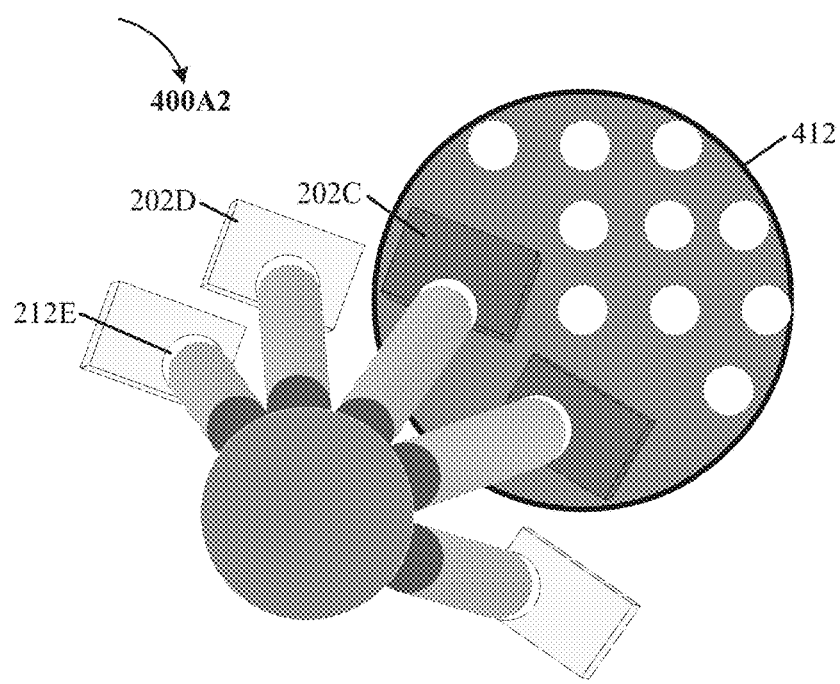

FIG. 4A illustrates one implementation of a feeler object-density indicator 400A that provides visual feedback regarding density of a virtual object. In one implementation, the density value of a virtual object is dependent on the volume and pixel density of a voxel grid. In another implementation, the density value is designated. According to some implementations, one or more physical attributes of the feeler object-density indicator can be a function of the density values of the virtual objects such that color, shape, size, or opacity of the feeler object-density indicator are proportionally modified responsive to density values of the virtual objects that the feeler object-density indicator comes in contact with.

In other implementations, density values for high, medium, and low density thresholds can be set and corresponding physical attributes of the feeler object-density indicator can be associated with these thresholds. For instance, as shown in FIG. 4A, particular feeler object-density indicator 202C has a lower color density when it comes in virtual contact with a low-density virtual object 402 at action 400A1 and a higher color density when it comes in virtual contact with a high-density virtual object 412 at action 400A2.

In yet another implementation, visual feedback from the feeler object-density indicator can be calibrated based on densities of virtual objects that it comes in contact with. For instance, custom logic for feeler object-density indicator can be defined such that a particular value of a physical attribute of the feeler object-density indicator is mapped to an "optimal gestural effort" or "optimal gestural completeness" required to manipulate the virtual object proportional to density of the virtual object. In one example, color green can indicate that the applied effort, pressure, or force is adequate to displace a virtual object with particular density value. Also, color red can indicate that applied effort, pressure, or force is more than what is optimally required and can result in deforming the virtual object. Further, in some implementations, if the applied effort, pressure, or force is less than what is required to displace or deform the virtual object or the virtual object is immovable or non-deformable, but the control object continues its motion in the 3D sensory space, the feeler zone and feeler object-density indicator are automatically constrained and prevented from displacing or penetrating the virtual object.

Figure 4B:
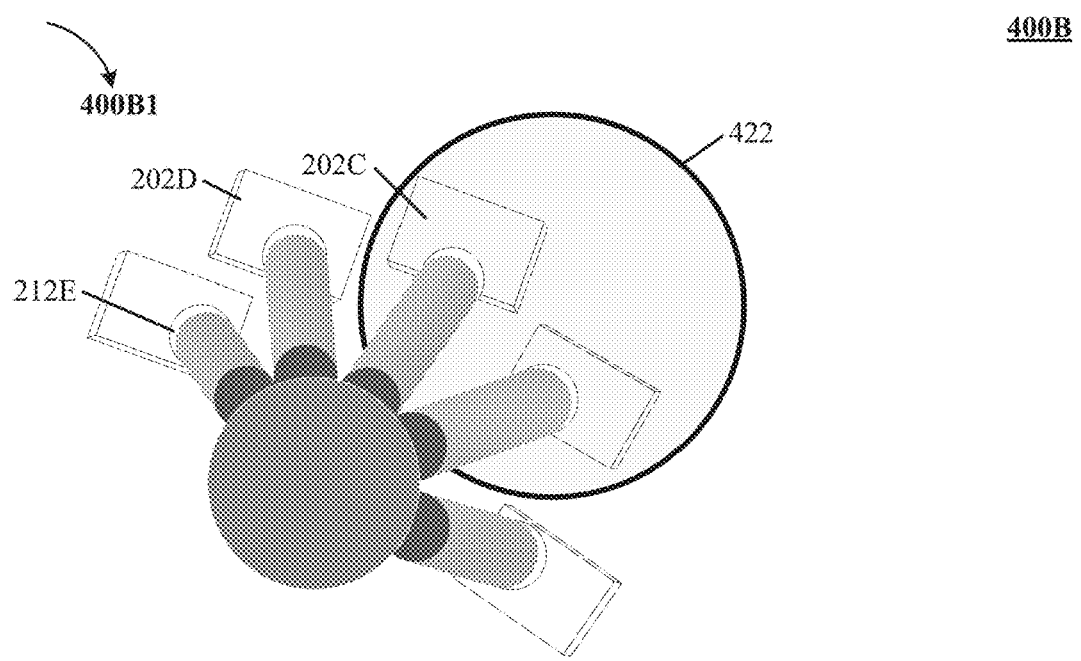
FIG. 4B is one implementation of a feeler object-mass indicator that provides visual feedback regarding mass of a virtual object.
Figure 4B:
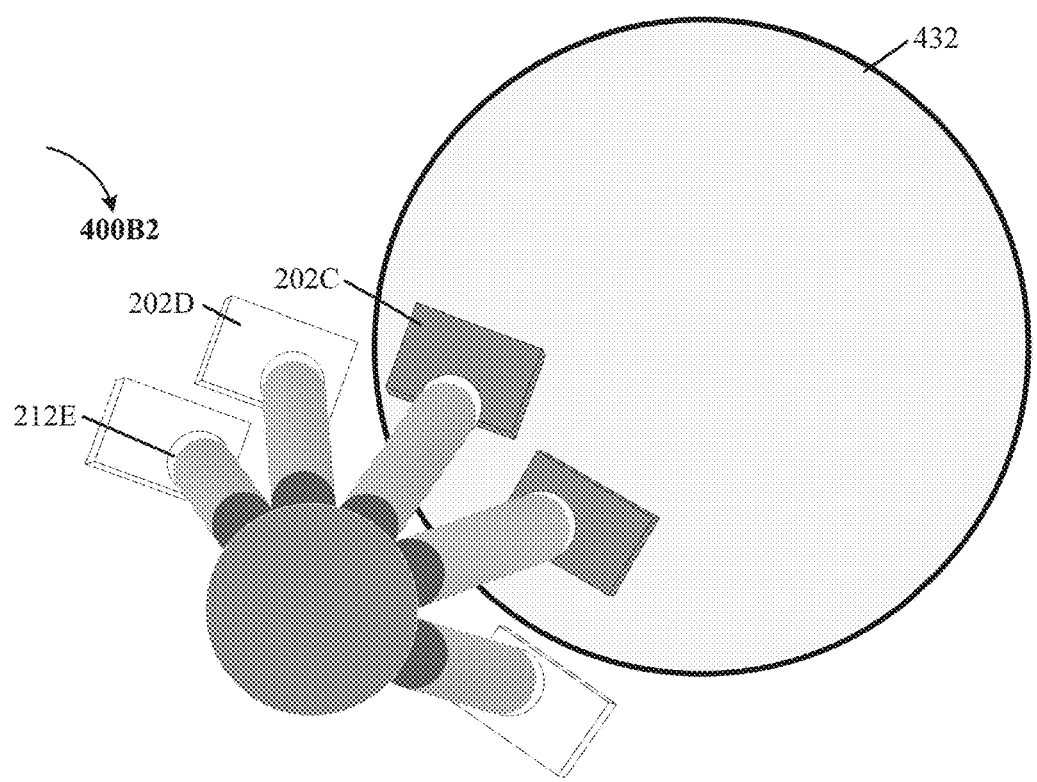

FIG. 4B is one implementation of a feeler object-mass indicator 400B that provides visual feedback regarding mass of a virtual object. In one implementation, the mass of a virtual object is dependent on the pixel area covered by the virtual object across a display. In another implementation, the mass is designated. According to some implementations, one or more physical attributes of the feeler object-mass indicator can be a function of the masses of the virtual objects such that color, shape, size, or opacity of the feeler object-mass indicator are proportionally modified responsive to mass values of the virtual objects that the feeler object-mass indicator comes in contact with.

In other implementations, values for high, medium, and low mass thresholds can be set and corresponding physical attributes of the feeler object-mass indicator can be associated with these thresholds. For instance, as shown in FIG. 4B, particular feeler object-density indicator 202C has a lower color density when it comes in virtual contact with a low-mass virtual object 422 at action 400B1 and a higher color density when it comes in virtual contact with a high-mass virtual object 432 at action 400B2.

In yet another implementation, visual feedback from the feeler object-mass indicator can be calibrated based on masses of virtual objects that it comes in contact with. For instance, custom logic for feeler object-mass indicator can be defined such that a particular value of a physical attribute of the feeler object-mass indicator is mapped to an "optimal gestural effort" or "optimal gestural completeness" required to manipulate the virtual object proportional to mass of the virtual object. In one example, color green can indicate that the applied effort, pressure, or force is adequate to displace a virtual object with particular mass. Also, color red can indicate that applied effort, pressure, or force is more than what is optimally required and can result in deforming the virtual object. Further, in some implementations, if the applied effort, pressure, or force is less than what is required to displace or deform the virtual object or the virtual object is immovable or non-deformable, but the control object continues its motion in the 3D sensory space, the feeler zone and feeler object-density indicator are automatically constrained and prevented from displacing or penetrating the virtual object.

Figure 4C:
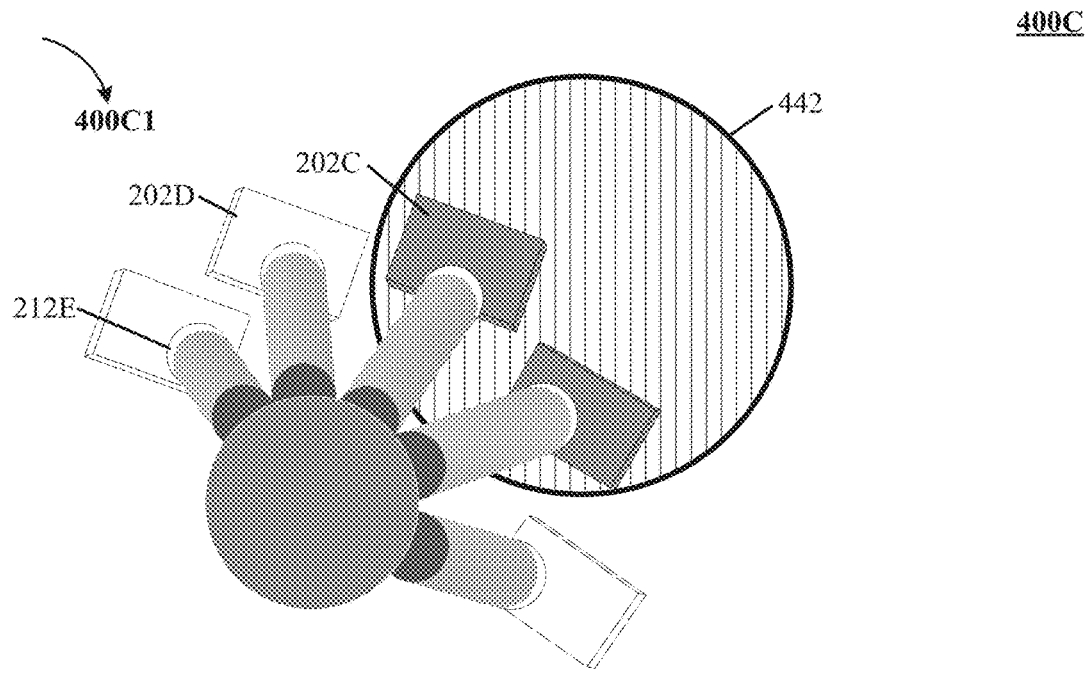
FIG. 4C depicts one implementation of a feeler surface-roughness indicator that provides visual feedback regarding roughness of a virtual object.
Figure 4C:
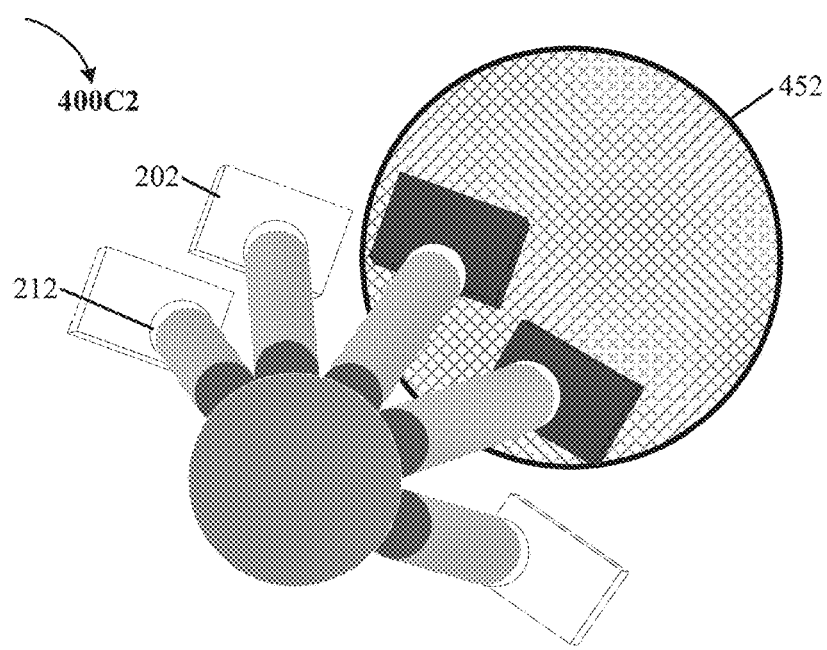

FIG. 4C depicts one implementation of a feeler surface-roughness indicator 400C that provides visual feedback regarding roughness of a virtual object. In one implementation, roughness magnitude of the virtual object is a function of a coefficient of friction. The coefficient of friction is based on virtual textures or patterns and their grooving, inter-element spacing, or element size. In another implementation, the coefficient of friction is designated. As shown in FIG. 4C, particular feeler object-density indicator 202C has a lower color density when it comes in virtual contact with a cloth-like surface of virtual object 442 at action 400C1 and a higher color density when it comes in virtual contact with a sandpaper-like surface of virtual object 452 at action 400C2.

Figure 4D:
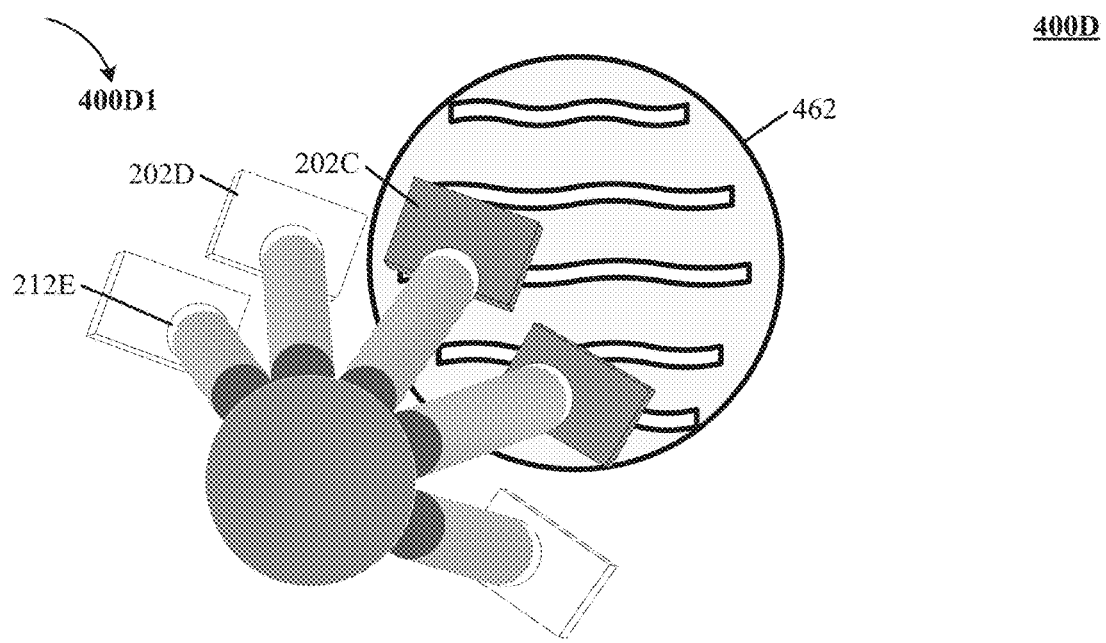
FIG. 4D illustrates one implementation of a feeler object-viscosity indicator that provides visual feedback regarding viscosity of a virtual object.
Figure 4D:
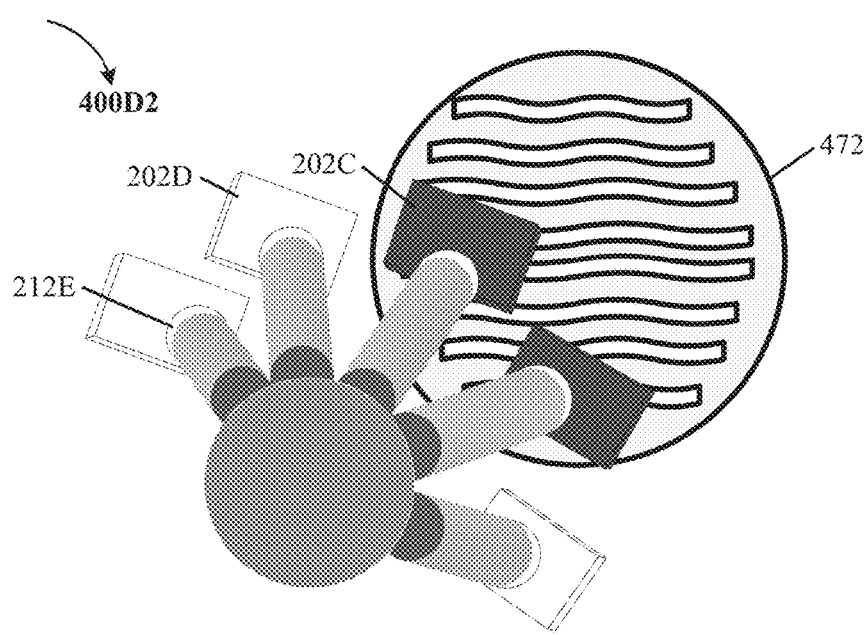

FIG. 4D illustrates one implementation of a feeler object-viscosity indicator 400D that provides visual feedback regarding viscosity of a virtual object. In one implementation, viscosity of the virtual object is based on Young's modulus of viscoelasticity. As shown in FIG. 4D, particular feeler object-density indicator 202C has a lower color density when it comes in virtual contact with a low-viscous virtual object 462 at action 400D1 and a higher color density when it comes in virtual contact with a high-viscous virtual object 472 at action 400D2.

Figure 4E:
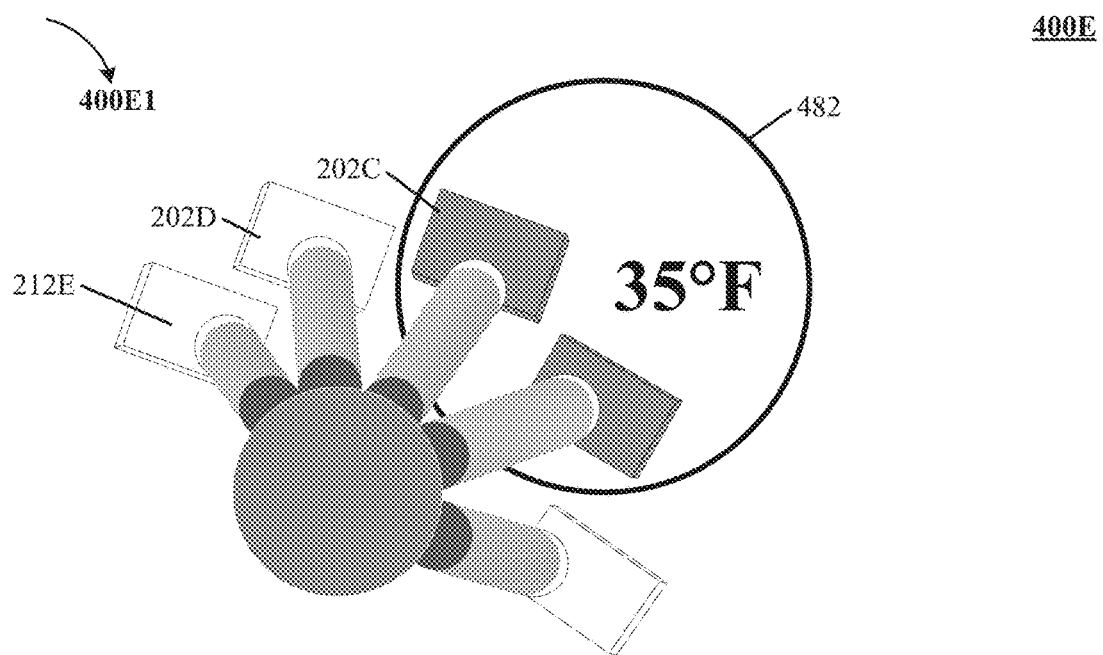
FIG. 4E shows one implementation of a feeler surface-temperature indicator that provides visual feedback regarding hotness or coldness of a virtual object.
Figure 4E:
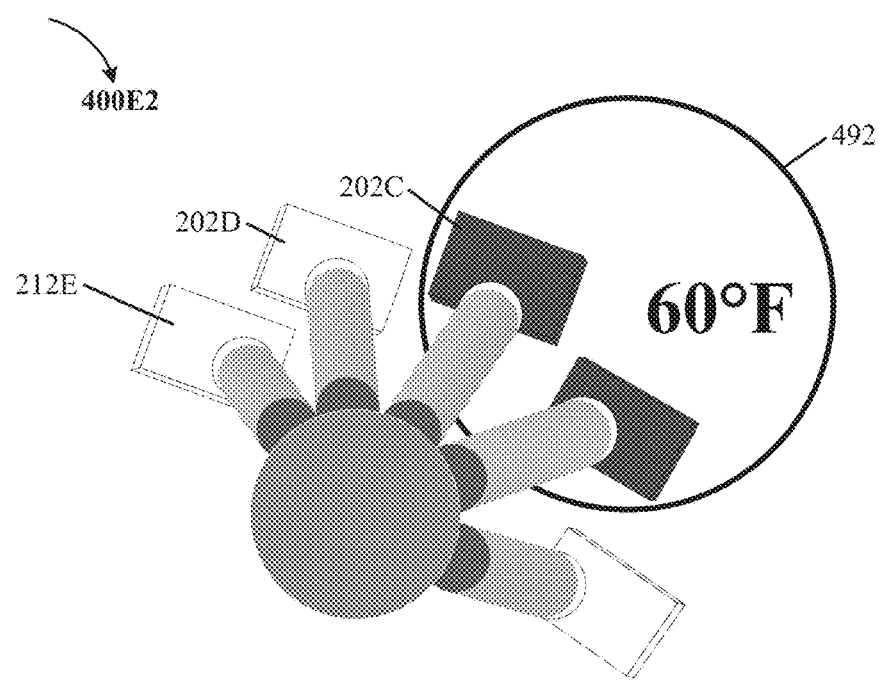

FIG. 4E shows one implementation of a feeler surface-temperature indicator 400E that provides visual feedback regarding hotness or coldness of a virtual object. In one implementation, temperature of the virtual object is designated. In another implementation, object color is used as a proxy for object temperature. As shown in FIG. 4E, particular feeler object-density indicator 202C has a lower color density when it comes in virtual contact with a 35° F. virtual object 482 at action 400E1 and a higher color density when it comes in virtual contact with a 60° F. virtual object 482 at action 400E2.

Haptic-Like Manipulation

Figure 5A:
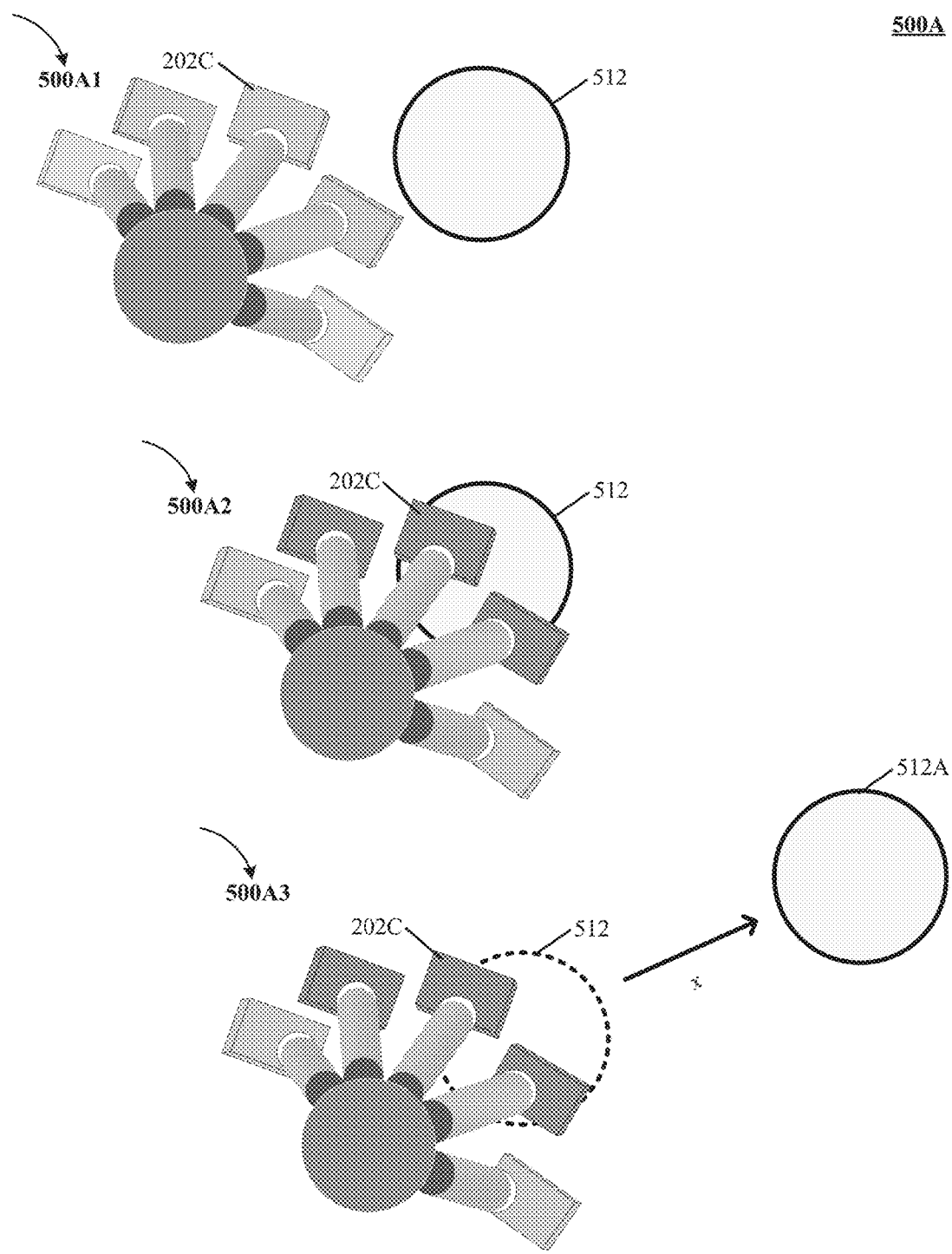
FIG. 5A is one implementation of manipulating a movable but non-deformable virtual object.

FIG. 5A is manipulation 500A of a movable but non-deformable virtual object 512, according to one implementation. At action 500A1, as the feeler zone 212 approaches the virtual object 512 in response to movement of the control object in the 3D space, particular feeler proximity-pressure indicators 202A-E continue to become darker proportional to their respective hover proximities to the virtual object 512. Further, at action 500A2, when the feeler zone 212 approaches the virtual object 512 within an initial hover proximity threshold, the feeler proximity-pressure indicator 202 snaps to the surface of the virtual object 512. Then, at action 500A3, in response to virtual contact of the feeler proximity-pressure indicator 202 with the virtual object 512, virtual object 512 is displaced by distance x. As a result, displacement of the virtual object 512 is depicted in the generated display (512A) without depicting penetration of the virtual object 512 by the feeler zone 212, while providing the visual feedback regarding the pressure applied by the virtual contact. Finally, the calculated pressure applied by the virtual contact is provided as input to gesture-recognition module 156 for further manipulating the virtual object 512.

Figure 5B:
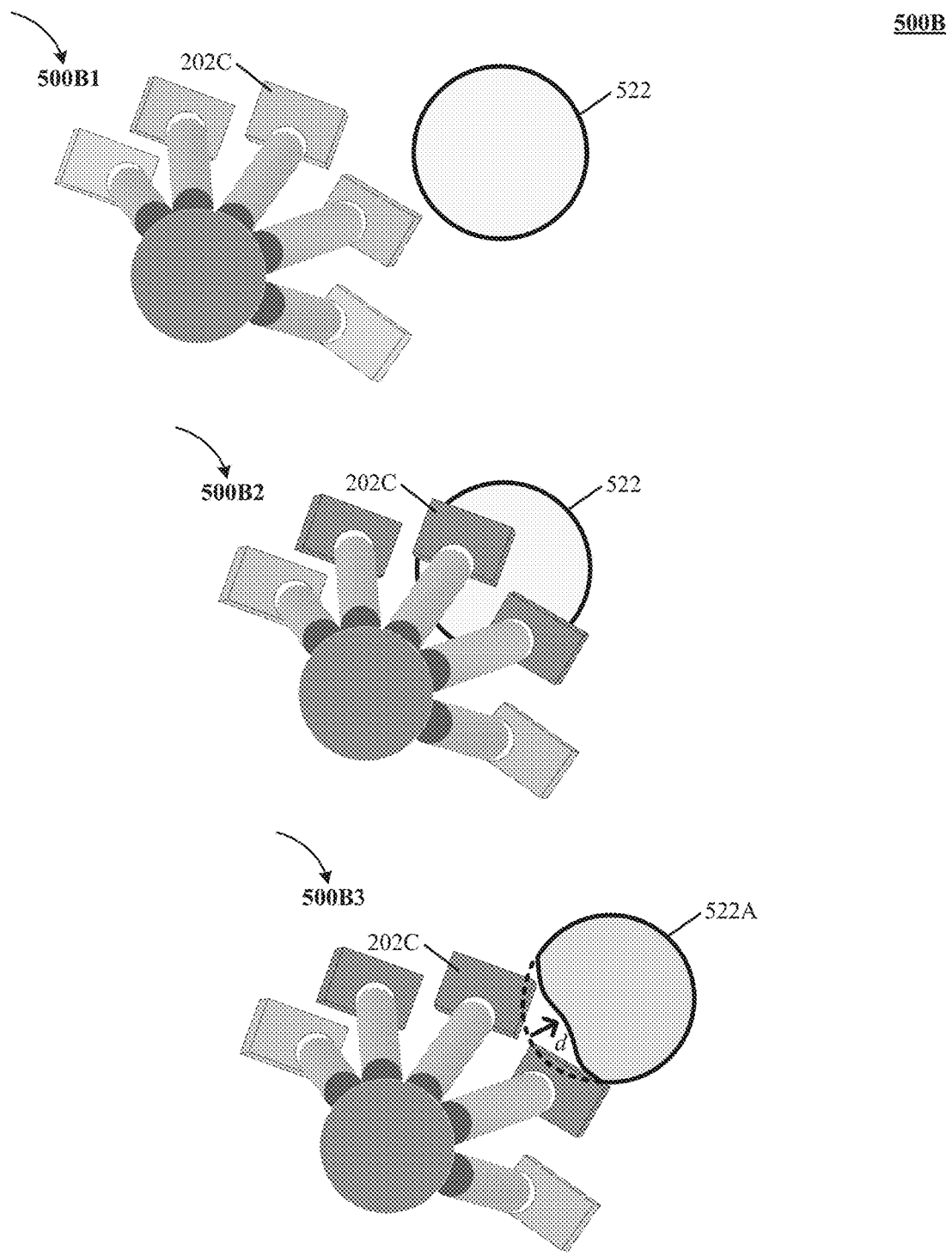
FIG. 5B illustrates one implementation of manipulating an immovable but deformable virtual object.

FIG. 5B illustrates manipulation 500B of an immovable but deformable virtual object 522, according to one implementation. At action 500B1, as the feeler zone 212 approaches the virtual object 522 in response to movement of the control object in the 3D space, particular feeler proximity-pressure indicators 202A-E continue to become darker proportional to their respective hover proximities to the virtual object 522. Further, at action 500B2, when the feeler zone 212 approaches the virtual object 522 within an initial hover proximity threshold, the feeler proximity-pressure indicator 202 snaps to the surface of the virtual object 522. Then, at action 500B3, in response to a period of virtual contact of the feeler proximity-pressure indicator 202 with the virtual object 522, virtual object 522 is deformed by depth d. As a result, deformation of the virtual object 522 is depicted (522A) in the generated display without depicting penetration of the virtual object 522 by the feeler zone 202, while providing the visual feedback regarding the pressure applied by the virtual contact. Finally, the calculated pressure applied by the virtual contact is provided as input to gesture-recognition module 156 for further manipulation of the virtual object 522.

Figure 5C:
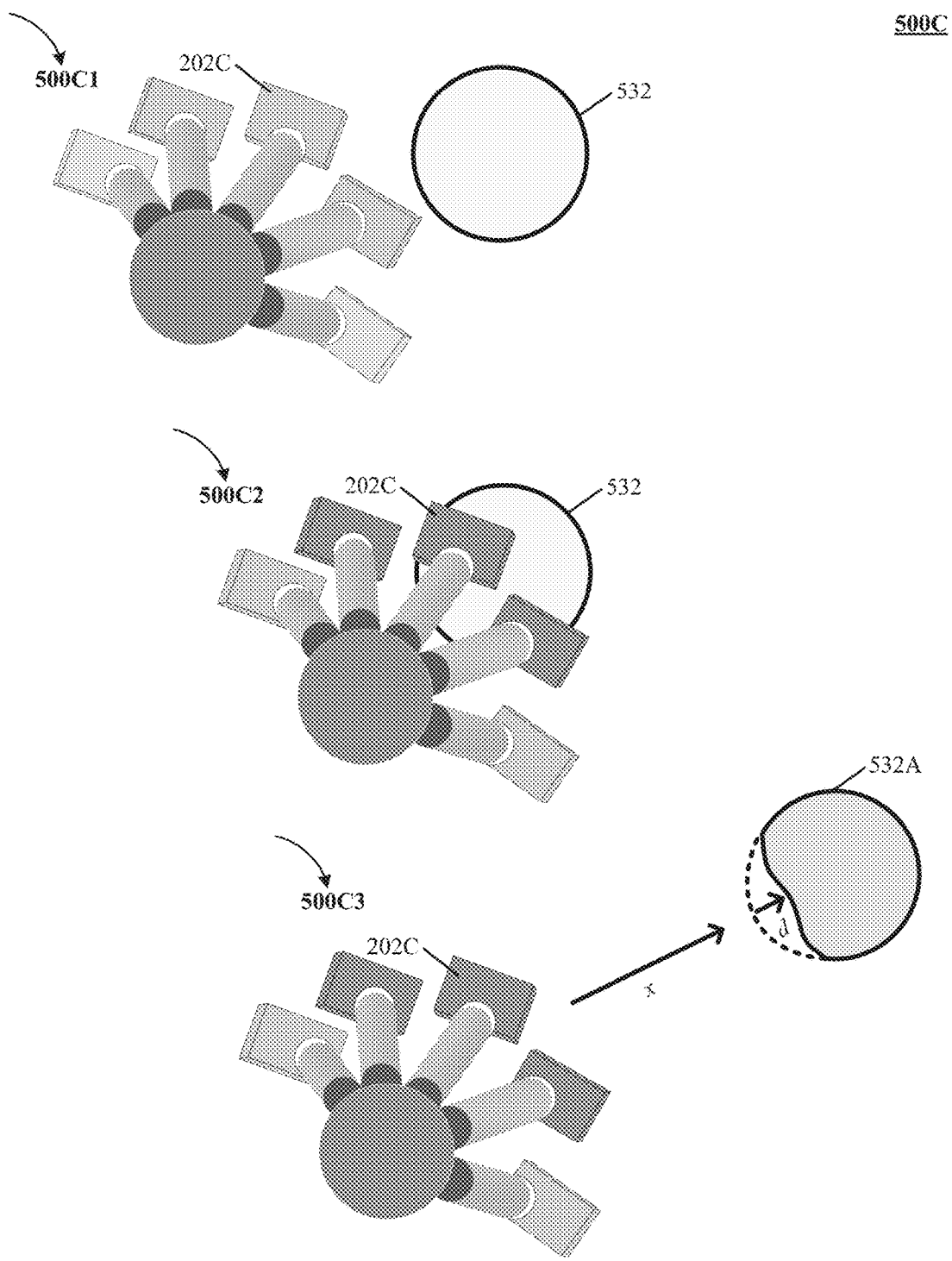
FIG. 5C shows one implementation of manipulating a movable and deformable virtual object.

FIG. 5C illustrates manipulation 500C of a movable and deformable virtual object 532, according to one implementation. At action 500C1, as the feeler zone 212 approaches the virtual object 532 in response to movement of the control object in the 3D space, particular feeler proximity-pressure indicators 202A-E continue to become darker proportional to their respective hover proximities to the virtual object 532. Further, at action 500C2, when the feeler zone 212 approaches the virtual object 532 within an initial hover proximity threshold, the feeler proximity-pressure indicator 202 snaps to the surface of the virtual object 532. Then, at action 500C3, in response to a period of virtual contact of the feeler proximity-pressure indicator 202 with the virtual object 532, virtual object 532 is displaced by distance x and deformed by depth d. As a result, displacement and deformation of the virtual object 532 is depicted (532A) in the generated display without depicting penetration of the virtual object 532 by the feeler zone 202, while providing the visual feedback regarding the pressure applied by the virtual contact. Finally, the calculated pressure applied by the virtual contact is provided as input to gesture-recognition module 156 for further manipulation of the virtual object 532.

Some implementations include depicting, in the generated display, inertia and non-deformability of the virtual object without depicting penetration of the virtual object by the feeler zone while providing the visual feedback regarding the pressure applied by the virtual contact and providing calculated pressure applied by the virtual contact as input to an object movement system. In one implementation, non-deformability refers to an initial form, shape, or size of a virtual object being preserved or maintained after a contact event. The calculated pressure applied by the virtual contact is then provided as input to gesture-recognition module 156 for further manipulation of the virtual object 532.

Other implementations include a feeler proximity-pressure audio generator that provides audio feedback regarding proximity of the feeler zone to the virtual object and escalation from proximity to pressure applied by virtual contact of the feeler zone with the virtual object. In one implementation, sound waves of varying frequencies and pitches are used to indicate different threshold magnitudes of different haptic properties of the virtual objects. In some other implementations, feeler audio generators can be used to provide audio feedback regarding other haptic properties of a virtual object such as density, surface texture, mass, viscosity, plasticity, elasticity, or temperature. In yet other implementations, feeler vibrators can be used to provide tactile feedback regarding the different haptic properties through vibration frequencies of varying magnitudes.

Virtual Grip

Figure 6:
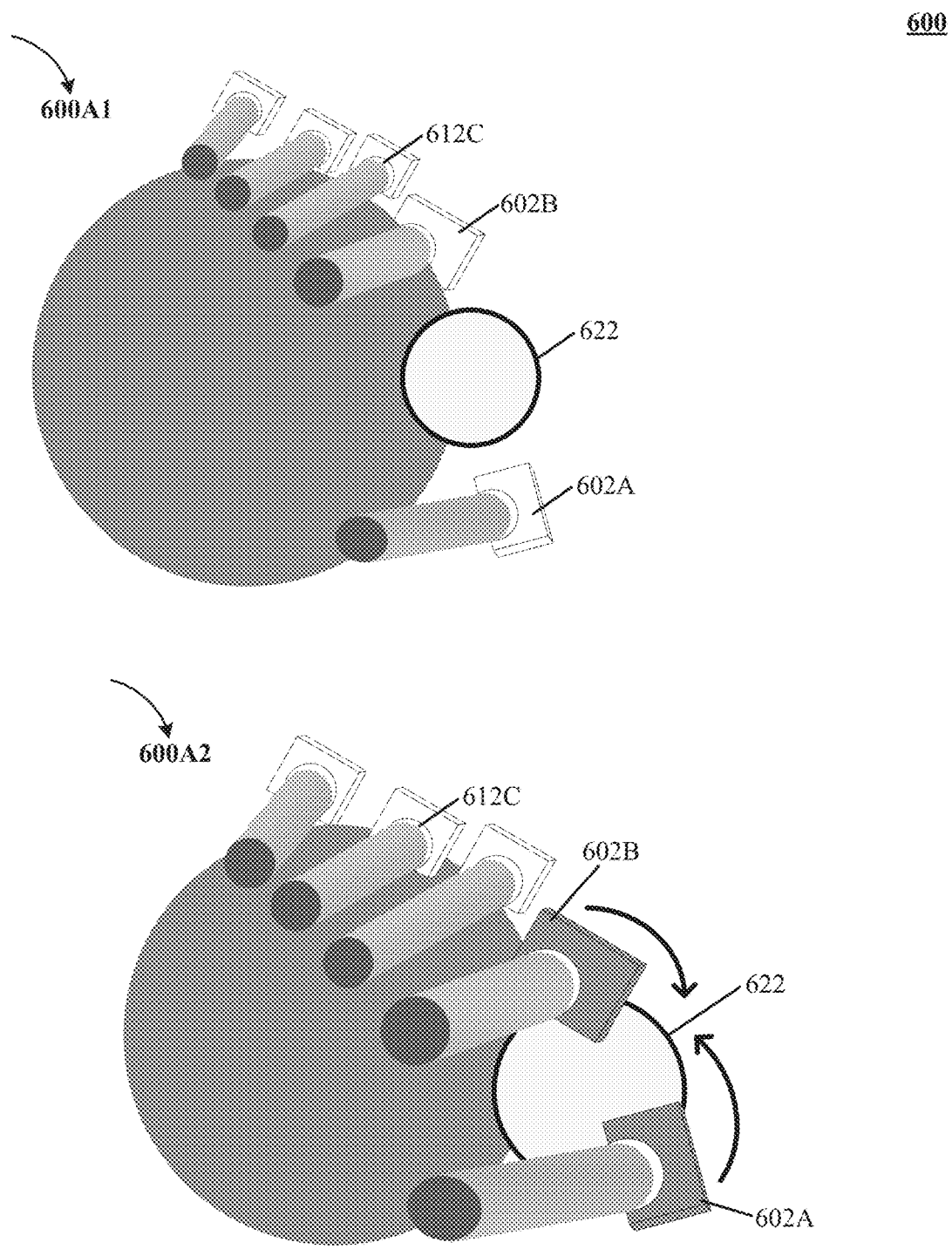
FIG. 6 depicts one implementation of generating for display a feeler grip-indicator that provides visual feedback regarding grip on a virtual object.

FIG. 6 depicts one implementation of generating for display a feeler grip-indicator 600 that provides visual feedback regarding grip on a virtual object 622. At action 600A1, when feeler zones 612A-E approach the virtual object 622 within an initial hover proximity threshold, the feeler grip-indicator 600 grasps the virtual object 622. After grasping the virtual object 622 at action 600A2, feeler zones 612A-E, apply opposing forces on the virtual object 622. In some implementations, feeler-grip indicators 602A-E provide visual feedback regarding different magnitudes of pressure applied by feeler zones 612A-E corresponding to different portions of a control object (e.g. fingers of a hand).

In some implementations, custom logic for feeler-grip indicators 602A-E can be defined such that a particular value of a physical attribute of the feeler object-mass indicator is mapped to an "optimal gestural effort" or "optimal gestural completeness" required to manipulate the virtual object 622 proportional to mass, density, surface texture, elasticity, plasticity, or viscosity of the virtual object 622. In one example, color green can indicate that the applied effort, pressure, or force is adequate for creating a strong grip and to lift a virtual object with particular mass, density value, surface texture-type, elasticity level, plasticity level, or viscosity level. Also, color red can indicate that applied effort, pressure, or force is more than what is optimally required and can result in deforming the virtual object 622. Further, in some implementations, if the applied effort, pressure, or force is less than what is required to properly grasp or lift the virtual object 622 is immovable or non-graspable, but the control object continues its motion in the 3D sensory space, the feeler zones 612A-E and feeler-grip indicators 602A-E are automatically constrained and prevented from displacing or penetrating the virtual object 622.

Intent

Figure 7A:
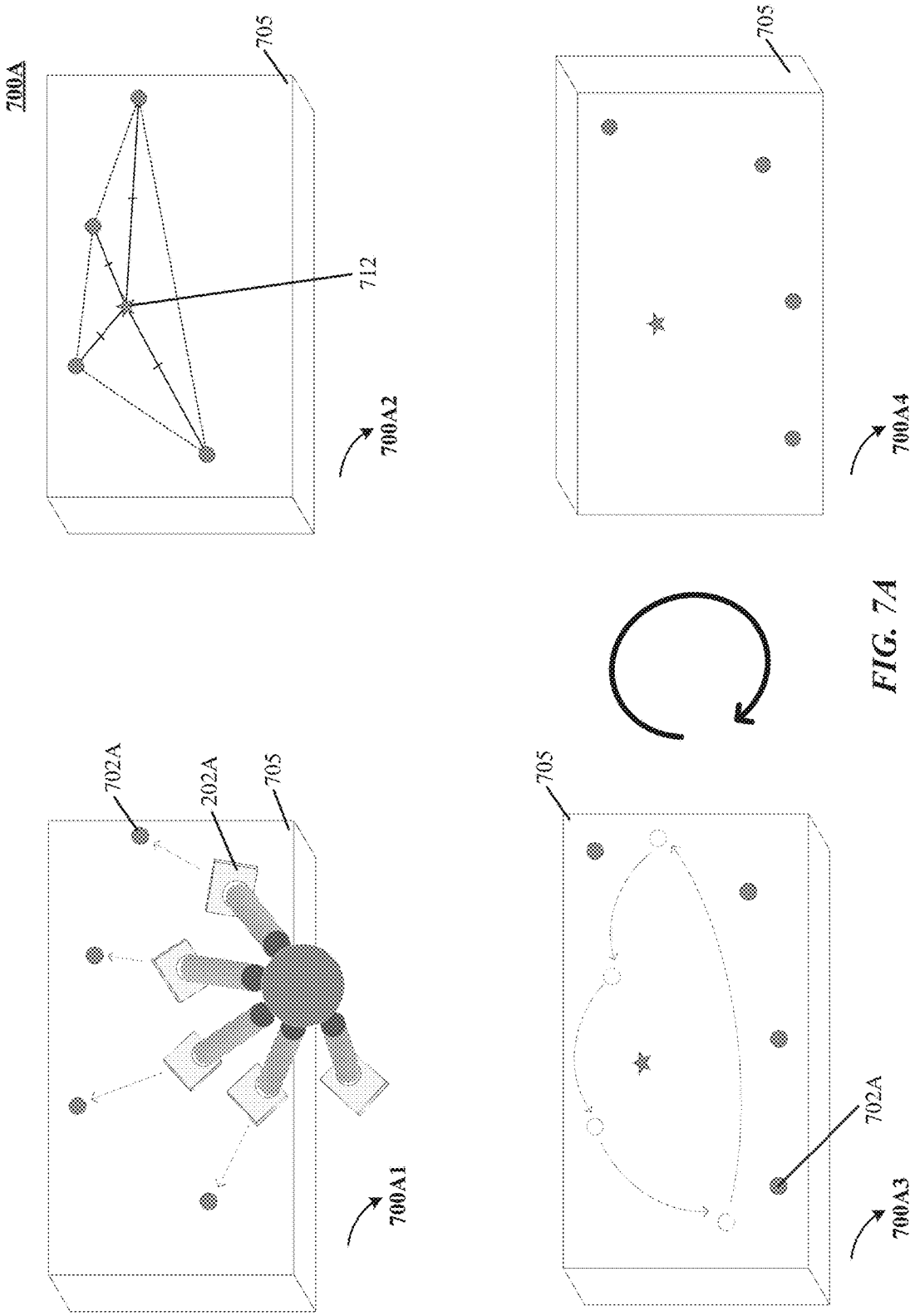
FIG. 7A illustrates one implementation of identifying a intent as rotational.

FIG. 7A illustrates identification 700A of a intent as rotational, according to one implementation. At action 700A1, a plurality of forces are applied to a movable virtual object 705 at one or more points of virtual contacts 702A-D of feeler zones 202A-D with the virtual object 705. At action 700A2, a center of effort 712 is calculated for the forces applied by the feeler zones 202A-D. In one implementation, the center of effort 712 is calculated by determining a geometric centroid of the polygon formed by the applied forces. For further information regarding calculating geometric centroids, reference can be made to Wolfram Math-World, at http://mathworld.wolfram.com/GeometricCentroid.html, Geometric Centroid, on Feb. 4, 204, 03:21 UTC.

In some implementations, a gesture-type is determined based on movement of the points of virtual contacts 702A-D with respect to the center of effort 712. At action 700A3, the gesture-type is identified as a rotational stroke in response to detecting rotation of the points of virtual contacts around the center of effort 712. The virtual object 705 is then rotated at action 700A3 in response to the rotational stroke.

FIG. 7B shows identification 700B of a intent as translational, according to one implementation. At action 700B1, a plurality of forces are applied to a movable virtual object 705 at one or more points of virtual contacts 722A-D of feeler zones 202A-D with the virtual object 705. At action 700B2, a center of effort 732 is calculated for the forces applied by the feeler zones 202A-D. In one implementation, the center of effort 732 is calculated by determining a geometric centroid of the polygon formed by the applied forces. For further information regarding calculating geometric centroids, reference can be made to Wolfram MathWorld, at http://mathworld.wolfram.com/GeometricCentroid.html,
Geometric Centroid, on Feb. 4, 204, 03:21 UTC.

In some implementations, a gesture-type is determined based on movement of the center of effort 732. At action 700B3, the gesture-type is identified as a translational stroke in response to detecting displacement of the center of effort 732. The virtual object 705 is then translated at action 700B3 in response to the translational stroke.

Gestural Precision

Figure 8A:
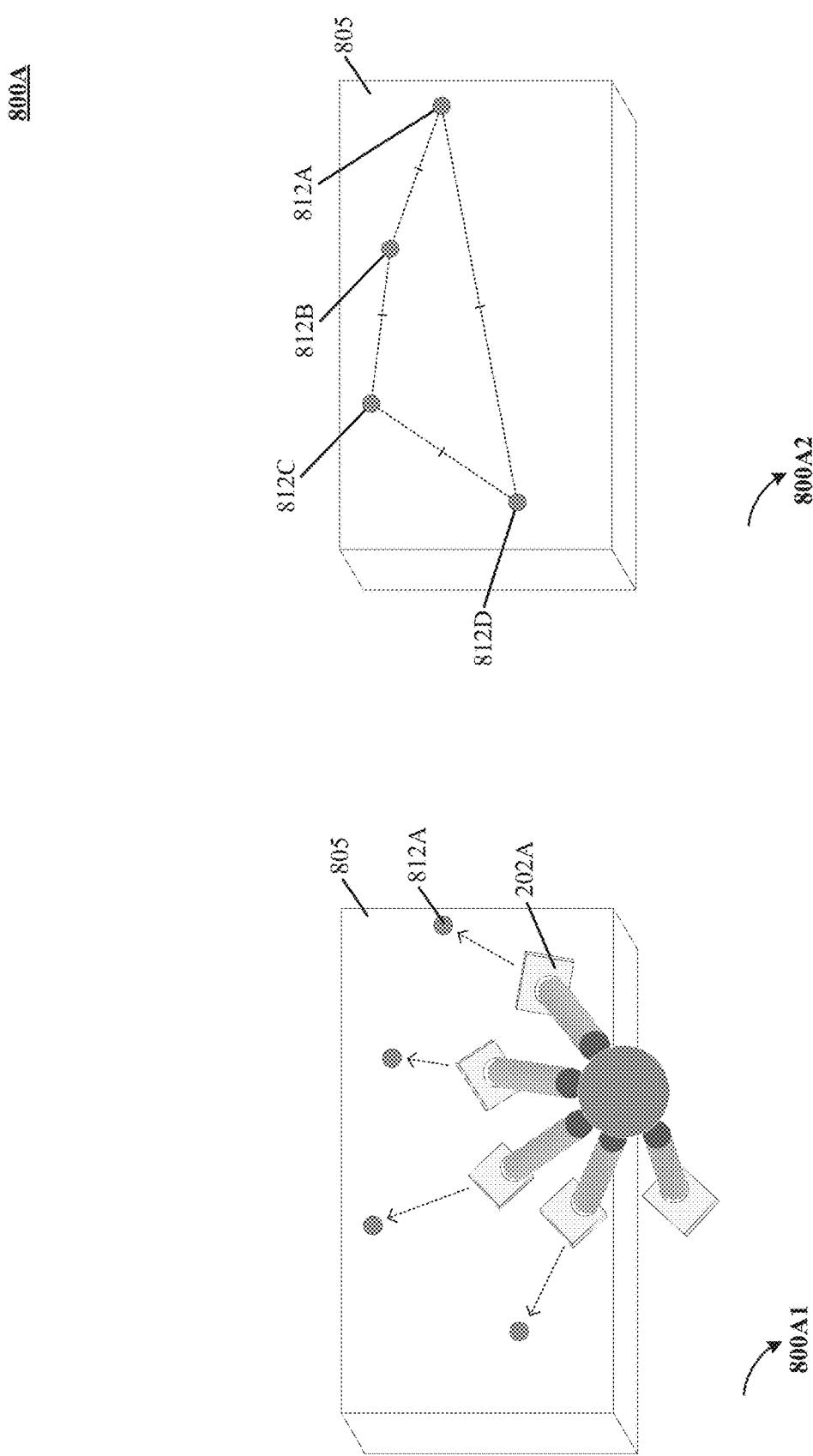
FIG. 8A shows one implementation of determining a gesture to be a gross motor gesture.

FIG. 8A shows determination 800A of a gesture as a gross motor gesture, according to one implementation. At action 800A1, a plurality of forces are applied to a movable virtual object 805, responsive to a control object-gesture, at one or more points of virtual contacts 812A-D of feeler zones 202A-D with the virtual object 805. In some implementations, a degree of precision of the control object-gesture is determined dependent on a number of points of virtual contacts 812A-D of the feeler zones 202A-B and proximities between the points of virtual contacts 812A-D. At action 800A2, the control object-gesture is determined to be a gross motor gesture when the degree of precision deceeds a precision threshold value. In one implementation, the precision threshold value can be based on an absolute number, a percentage, or a distance measurement.

Figure 8B:
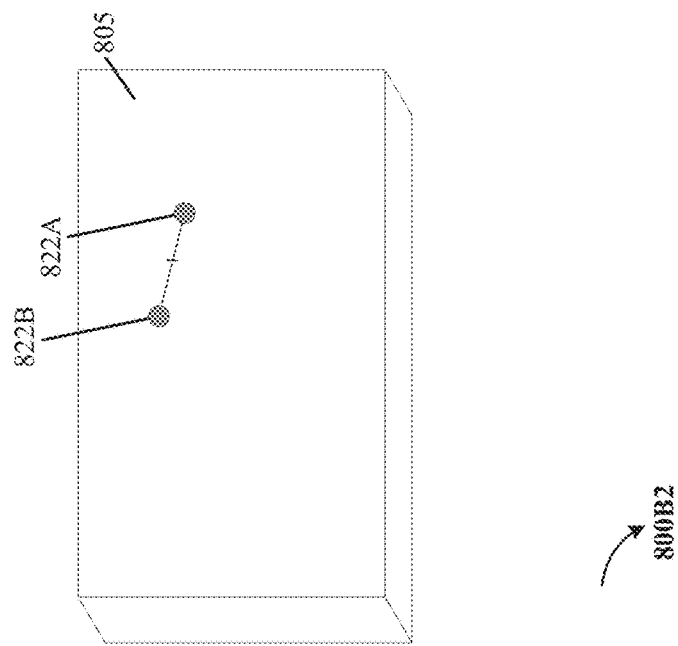
FIG. 8B is one implementation of determining a gesture to be a fine motor gesture.
Figure 8B:
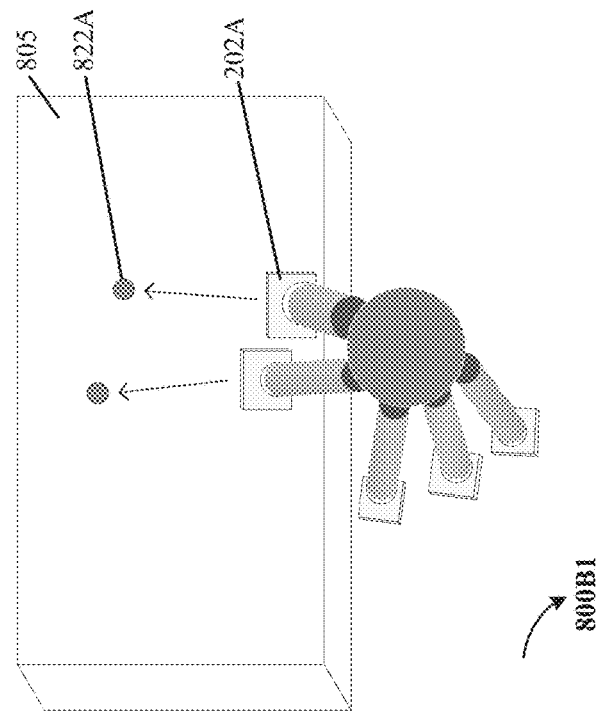

FIG. 8B shows determination 800B of a gesture as a fine motor gesture, according to one implementation. At action 800B1, a plurality of forces are applied to a movable virtual object 805, responsive to a control object-gesture, at one or more points of virtual contacts 822A-B of feeler zones 202A-B with the virtual object 805. In some implementations, a degree of precision of the control object-gesture is determined dependent on a number of points of virtual contacts 822A-B of the feeler zones 202A-D and proximities between the points of virtual contacts 822A-B. At action 800B2, the control object-gesture is determined to be a fine motor gesture when the degree of precision exceeds a precision threshold value. In one implementation, the precision threshold value can be based on an absolute number, a percentage, or a distance measurement.

Flowcharts

Figure 9:
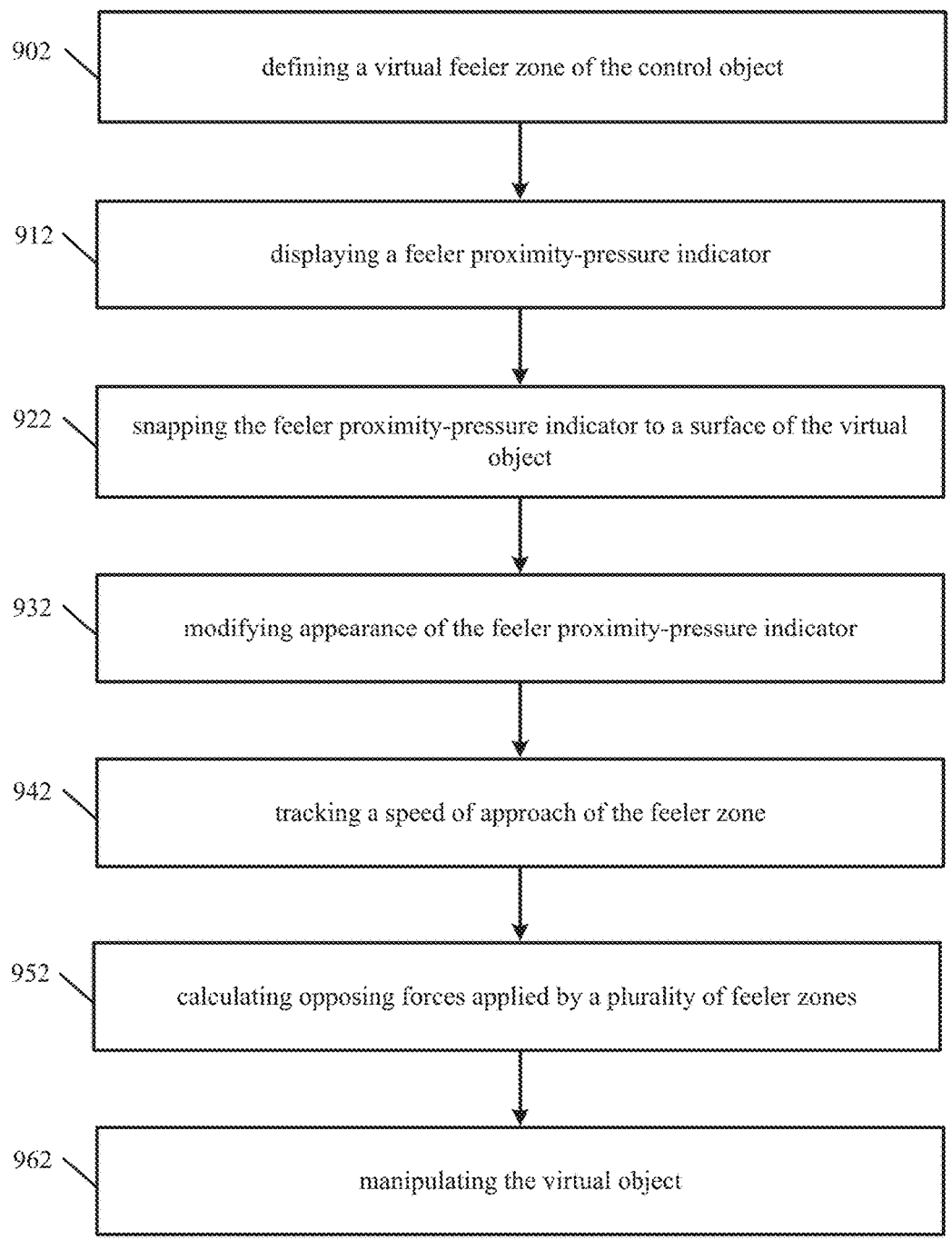

FIG. 9 depicts a representative method 900 of providing haptic feedback for an interaction between a control object in a three-dimensional (3D) sensory space and a virtual object in a virtual space that the control object interacts with. At action 902, a virtual feeler zone of the control object is defined. In one implementation, the virtual feeler zone reproduces movements of the control object in a virtual space that are captured in the 3D sensory space. In another implementation, a synthetic or augmented space is created by overlaying the virtual space on a physical space and the virtual feeler zone reproduces movements of the control object in the synthetic or augmented space.

At action 912, a feeler proximity-pressure indicator is generated for display that provides visual feedback regarding proximity of the feeler zone to the virtual object and escalation from proximity to pressure applied by virtual contact of the feeler zone with the virtual object. At action 922, the feeler proximity-pressure indicator is snapped to a surface of the virtual object when the feeler zone approaches the virtual object within an initial hover proximity threshold.

At action 932, appearance of the feeler proximity-pressure indicator is modified responsive to distance between the feeler zone and the virtual object. In one implementation, size of the feeler proximity-pressure indicator is modified responsive to distance between the feeler zone and the virtual object. In another implementation, shape of the feeler proximity-pressure indicator is modified responsive to distance between the feeler zone and the virtual object. In yet another implementation, opacity of the feeler proximity-pressure indicator is modified responsive to distance between the feeler zone and the virtual object.

At action 942, a speed of approach of the feeler zone of the control object to a surface of the virtual object is tracked and an initial hover proximity threshold and calibration of the visual feedback is adjusted responsive to the speed of approach. In one implementation, the initial hover proximity threshold distance is adjusted proportionally to the speed of approach.

At action 952, opposing forces applied by a plurality of feeler zones to a movable virtual object are calculated and a feeler grip-indicator is displayed that provides visual feedback regarding whether the applied opposing forces are sufficient to grasp the virtual object proportional to the mass of the virtual object.

At action 962, the virtual object is manipulated responsive to the pressure applied by the virtual contact. In one implementation, the manipulation includes shaking, moving, or rotating the virtual object. In another implementation, manipulation includes selecting, grabbing, or lifting the virtual object.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Figure 10:
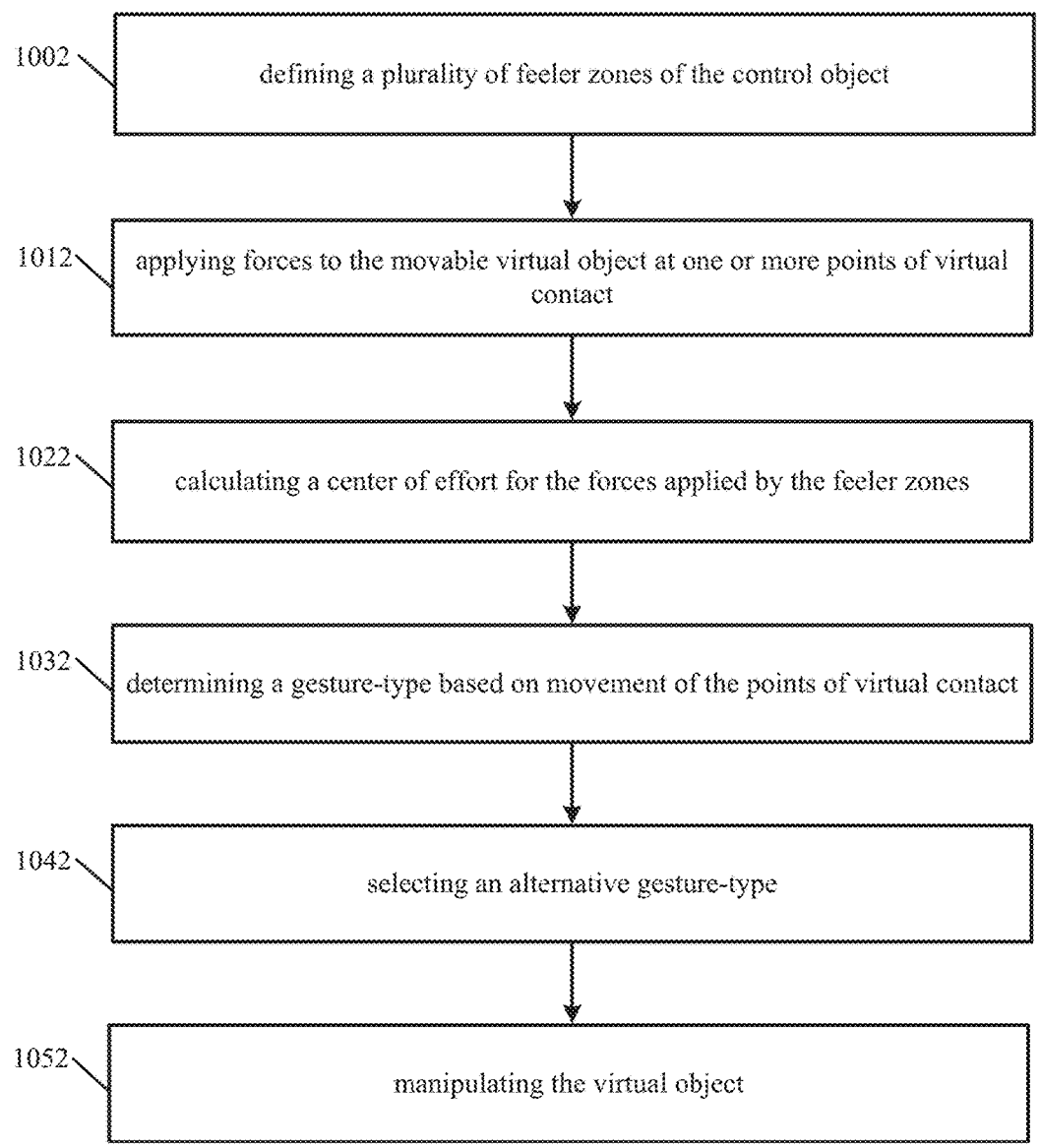

FIG. 10 illustrates one implementation of a method 1000 of determining intent for an interaction between a control object in a three-dimensional (3D) sensory space and a movable virtual object in a virtual space that the control object interacts with. At action 1002, a plurality of virtual feeler zones of the control object are defined. In one implementation, the virtual feeler zones reproduce movements of the control object in a virtual space that are captured in the 3D sensory space. In another implementation, a synthetic or augmented space is created by overlaying the virtual space on a physical space and the virtual feeler zones reproduce movements of the control object in the synthetic or augmented space.

At action 1012, a plurality of forces are applied to the movable virtual object at one or more points of virtual contacts of the feeler zones with the virtual object in response to detecting a control object-gesture. At action 1022, a center of effort for the forces applied by the feeler zones is calculated by determining a geometric centroid of a polygon forced by the points of virtual contacts.

At action 1032, a gesture-type is determined based on movement of the points of virtual contacts and the center of effort. In one implementation, the gesture-type is identified as a translational stroke in response to detecting displacement of the center of effort. In another implementation, the gesture-type is identified as a rotational stroke in response to detecting rotation of the points of virtual contacts around the center of effort.

At action 1042, an unrealistic gesture-type is recognized when a distance between the feeler zones exceeds a realistic threshold. In one implementation, the realistic threshold can be determined from reference sources or experimentally measured data. In another implementation, an alternative gesture-type is selected based on an unrealistic position of a particular feeler zone that exceeded the realistic threshold.

At action 1052, the virtual object is manipulated responsive to the determined gesture-type. In one implementation, the manipulation includes shaking, moving, or rotating the virtual object. In another implementation, manipulation includes selecting, grabbing, or lifting the virtual object.

This method and other implementations of the technology disclosed can include one or more of the following features and/or features described in connection with additional methods disclosed. Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Figure 11:
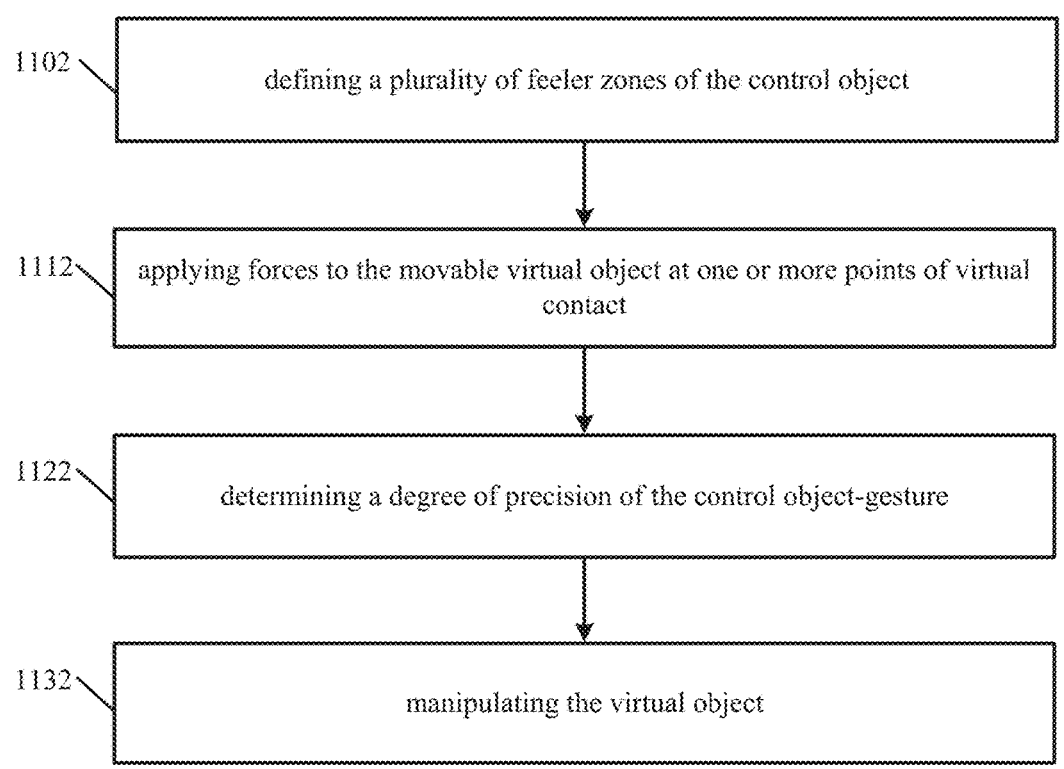
FIG. 11 is a flowchart showing a method of determining a degree of precision of a gesture in accordance with implementations of the technology disclosed.

FIG. 11 is a flowchart showing a method 1100 of determining a degree of precision of a gesture in accordance with implementations of the technology disclosed. At action 1102, a plurality of virtual feeler zones of the control object are defined. In one implementation, the virtual feeler zones reproduce movements of the control object in a virtual space that are captured in the 3D sensory space. In another implementation, a synthetic or augmented space is created by overlaying the virtual space on a physical space and the virtual feeler zones reproduce movements of the control object in the synthetic or augmented space.

At action 1112, a plurality of forces are applied to the movable virtual object at one or more points of virtual contacts of the feeler zones with the virtual object in response to detecting a control object-gesture. At action 1122, a degree of precision of the control object-gesture is determined responsive to a number of points of virtual contacts of the feeler zones and proximities between the points of virtual contacts. In one implementation, the control object-gesture is determined to be a gross motor gesture when the degree of precision exceeds a precision threshold value. In another implementation, the control object-gesture is determined to be a fine motor gesture when the degree of precision deceeds a precision threshold value.

At action 1132, the virtual object is manipulated based on the determined degree of precision. In one implementation, the manipulation includes shaking, moving, or rotating the virtual object. In another implementation, manipulation includes selecting, grabbing, or lifting the virtual object.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

This method and other implementations of the technology disclosed can include one or more of the following features and/or features described in connection with additional methods disclosed. Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of providing visual feedback for an interaction between a control object in a three-dimensional (3D) sensory space and a virtual object in a virtual space that the control object interacts with, the method including:
    defining a virtual feeler zone for at least a portion of a human hand that serves as a control object that is tracked by a gesture-recognition system while moving in the three-dimensional (3D) sensory space;
    generating for display, a feeler proximity-pressure indicator that provides visual feedback including:
        a visual indication of proximity of the virtual feeler zone to the virtual object; and
        a visual indication of escalation from proximity to pressure applied by virtual contact of the virtual feeler zone with the virtual object;
    modifying presentation of the feeler proximity-pressure indicator responsive to changes in distance between the virtual object and a tracked position of the at least a portion of a human hand that serves as a control object detected by the gesture-recognition system while the at least a portion of a human hand that serves as a control object moves in the three-dimensional (3D) sensory space; and
    presenting to a user the feeler proximity-pressure indicator modified; thereby indicating that the virtual object is manipulated responsive to virtual contact with the at least a portion of a human hand that serves as a control object,
    wherein the gesture-recognition system uses only stereoscopic vision to detect motion of the hand as it moves freely in space without contacting any other physical objects.

2. The method of claim 1, wherein the virtual feeler zone is a virtual extension of the control object.

3. The method of claim 1, wherein the virtual feeler zone is a deformable region of the control object.

4. The method of claim 1, wherein the feeler proximity-pressure indicator is located at a distal end of the virtual feeler zone.

5. The method of claim 1, further including snapping the feeler proximity-pressure indicator to a surface of the virtual object when the virtual feeler zone approaches the virtual object within an initial hover proximity threshold.

6. The method of claim 1, further including modifying appearance of the feeler proximity-pressure indicator responsive to distance between the virtual feeler zone and the virtual object.

7. The method of claim 1, further including modifying size of the feeler proximity-pressure indicator responsive to distance between the virtual feeler zone and the virtual object.

8. The method of claim 1, further including modifying shape of the feeler proximity-pressure indicator responsive to distance between the virtual feeler zone and the virtual object.

9. The method of claim 1, further including modifying opacity of the feeler proximity-pressure indicator responsive to distance between the virtual feeler zone and the virtual object.

10. The method of claim 1, further including applying a spring function to calculate pressure applied by virtual contact over a compressible range.

11. The method of claim 1, further including:
tracking a speed of approach of the virtual feeler zone of the control object to a surface of the virtual object; and
adjusting an initial hover proximity threshold and calibration of the visual feedback responsive to the speed of approach.

12. The method of claim 11, wherein the initial hover proximity threshold distance is adjusted proportionally to the speed of approach.

13. The method of claim 1, wherein the virtual object is movable when the virtual feeler zone applies pressure and not deformable, further including:
responsive to virtual contact of the virtual feeler zone with the virtual object, depicting for display, displacement of the virtual object without depicting penetration of the virtual object by the virtual feeler zone, while providing the visual feedback regarding the pressure applied by virtual contact; and
providing calculated pressure applied by virtual contact as input to an object movement system.

14. The method of claim 1, wherein the virtual object is deformable when the virtual feeler zone applies pressure, further including:
responsive to a period of virtual contact of the virtual feeler zone with the virtual object, depicting for display, deformation of the virtual object without depicting penetration of the virtual object by the virtual feeler zone, while providing the visual feedback regarding the pressure applied by virtual contact; and
providing calculated pressure applied by virtual contact as input to an object movement system.

15. The method of claim 1, wherein the virtual object is movable and deformable when the virtual feeler zone applies force, further including
responsive to a period of virtual contact of the virtual feeler zone with the virtual object, depicting for display, displacement and deformation of the virtual object without depicting penetration of the virtual object by the virtual feeler zone, while providing the visual feedback regarding pressure applied by virtual contact; and
providing calculated pressure applied by virtual contact as input to an object movement system.

16. The method of claim 1, wherein the virtual object is immovable and not deformable when the virtual feeler zone applies force, further including
responsive to a continuous virtual contact of the virtual feeler zone with the virtual object, depicting for display, inertia and non-deformability of the virtual object without depicting penetration of the virtual object by the virtual feeler zone, while providing the visual feedback regarding pressure applied by virtual contact; and
providing calculated pressure applied by virtual contact as input to an object movement system.

17. The method of claim 1, wherein the virtual object has a surface texture, further including generating for display a feeler surface-roughness indicator that provides visual feedback regarding roughness of the surface texture.

18. The method of claim 1, wherein the virtual object is a rigid solid, further including generating for display a feeler object-mass indicator that provides visual feedback regarding mass of the rigid solid.

19. The method of claim 1, wherein the virtual object is a volumetric solid, further including generating for display a feeler object-density indicator that provides visual feedback regarding density of the volumetric solid.

20. The method of claim 1, wherein the virtual object is a fluid that conforms to the control object, further including generating for display a feeler object-viscosity indicator that provides visual feedback regarding viscosity of the fluid.

21. The method of claim 1, wherein the virtual object has a surface temperature, further including generating for display a feeler surface-temperature indicator that provides visual feedback regarding hotness or coldness of a surface of the virtual object.

22. The method of claim 1, further including:
calculating opposing forces applied by a plurality of feeler zones to a movable virtual object; and
generating for display a feeler grip-indicator that provides visual feedback regarding whether opposing forces applied by a plurality of feeler zones are sufficient to grasp the virtual object proportional to mass of the virtual object.

23. The method of claim 1, further including:
calculating opposing forces applied by a plurality of feeler zones to a movable virtual object; and
generating for display a feeler grip-indicator that provides visual feedback regarding whether opposing forces applied by a plurality of feeler zones are sufficient to grasp the virtual object proportional to density of the virtual object.

24. The method of claim 1, further including:
calculating opposing forces applied by a plurality of feeler zones to a movable virtual object; and
generating for display a feeler grip-indicator that provides visual feedback regarding whether opposing forces applied by a plurality of feeler zones are sufficient to grasp the virtual object proportional to surface texture of the virtual object.

25. The method of claim 1, further including the human hand grasping the virtual object; and
modifying presentation of the feeler proximity-pressure indicator responsive to grasping to provide a visual indication of escalation from proximity to pressure applied by virtual contact of the virtual feeler zone with the virtual object during grasping.

26. The method of claim 1, further including the human hand being empty.

27. A system for providing visual feedback for an interaction between a control object in a three-dimensional (3D) sensory space and a virtual object in a virtual space that the control object interacts with, the system including:
   a processor and a computer readable storage medium storing computer instructions configured to cause the processor to:
      define a virtual feeler zone for at least a portion of a human hand that serves as a control object that is tracked by a gesture-recognition system while moving in the three-dimensional (3D) sensory space;
      generate for display, a feeler proximity-pressure indicator that provides visual feedback including:
         a visual indication of proximity of the virtual feeler zone to the virtual object; and
         a visual indication of escalation from proximity to pressure applied by virtual contact of the virtual feeler zone with the virtual object;
      modify presentation of the feeler proximity-pressure indicator responsive to changes in distance between the virtual object and a tracked position of the at least a portion of a human hand that serves as a control object detected by the gesture-recognition system while the at least a portion of a human hand that serves as a control object moves in the three-dimensional (3D) sensory space; and
   present to a user the feeler proximity-pressure indicator modified; thereby indicating that the virtual object is manipulated responsive to virtual contact with the at least a portion of a human hand that serves as a control object,
      wherein the gesture-recognition system uses only stereoscopic vision to detect motion of the hand as it moves freely in space without contacting any other physical objects.

28. The system of claim 27, further including the human hand shaking the virtual object; and modifying presentation of the feeler proximity-pressure indicator responsive to shaking to provide a visual indication of escalation from proximity to pressure applied by virtual contact of the virtual feeler zone with the virtual object during shaking.

29. A non-transitory computer readable medium impressed with instructions to provide visual feedback for an interaction between a control object in a three-dimensional (3D) sensory space and a virtual object in a virtual space that the control object interacts with, which instructions when executed by one or more processors implement a method including:
   defining a virtual feeler zone for at least a portion of a human hand that serves as a control object that is tracked by a gesture-recognition system while moving in the three-dimensional (3D) sensory space;
   generating for display, a feeler proximity-pressure indicator that provides visual feedback including:
      a visual indication of proximity of the virtual feeler zone to the virtual object; and
      a visual indication of escalation from proximity to pressure applied by virtual contact of the virtual feeler zone with the virtual object;
   modifying presentation of the feeler proximity-pressure indicator responsive to changes in distance between the virtual object and a tracked position of the at least a portion of a human hand that serves as a control object detected by the gesture-recognition system while the at least a portion of a human hand that serves as a control object moves in the three-dimensional (3D) sensory space; and
   presenting to a user the feeler proximity-pressure indicator modified; thereby indicating that the virtual object is manipulated responsive to virtual contact with the at least a portion of a human hand that serves as a control object,
      wherein the gesture-recognition system uses only stereoscopic vision to detect motion of the hand as it moves freely in space without contacting any other physical objects.

\* \* \* \* \*